United States Patent
Habu et al.

(10) Patent No.: US 10,048,914 B2
(45) Date of Patent: Aug. 14, 2018

(54) SIMULTANEOUS DISPLAY OF DIFFERENT FINISHING RESULTS OF MULTIPLE RENDER UNITS

(71) Applicants: Yuichi Habu, Kanagawa (JP); Yoshinori Sochi, Tokyo (JP); Yosuke Aoki, Kanagawa (JP)

(72) Inventors: Yuichi Habu, Kanagawa (JP); Yoshinori Sochi, Tokyo (JP); Yosuke Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/624,511

(22) Filed: Feb. 17, 2015

(65) Prior Publication Data

US 2015/0235112 A1   Aug. 20, 2015

(30) Foreign Application Priority Data

Feb. 20, 2014 (JP) .................................. 2014-030978
Feb. 13, 2015 (JP) .................................. 2015-026697

(51) Int. Cl.
*G06K 15/02* (2006.01)
*G06K 15/00* (2006.01)
*G06F 3/12* (2006.01)

(52) U.S. Cl.
CPC ............ *G06F 3/1275* (2013.01); *G06F 3/121* (2013.01); *G06F 3/1207* (2013.01);
(Continued)

(58) Field of Classification Search
CPC ........ G06K 15/1822; H04N 2201/0094; G06F 3/1207; G06F 3/1208; G06F 3/121;
(Continued)

(56) References Cited

U.S. PATENT DOCUMENTS

2004/0196493 A1* 10/2004 Christiansen ......... G06F 3/1204
358/1.15
2005/0270587 A1* 12/2005 Yamakawa .............. H04N 1/00
358/448

(Continued)

FOREIGN PATENT DOCUMENTS

| JP | 2009-271930 | 11/2009 |
| JP | 2012-238188 | 12/2012 |
| JP | 2013-088992 | 5/2013 |

*Primary Examiner* — Iriana Cruz
(74) *Attorney, Agent, or Firm* — Duft Bornsen & Fettig LLP

(57) ABSTRACT

An information processing device is for creating render data by using a print job including print data and setting information. The information processing device includes a conversion unit configured to convert the setting information into device setting information for each of a plurality of render data creating units; the render data creating units being configured to create the render data from the print data and the device setting information; a render control unit configured to cause the render data creating units to respectively create the render data by using the device setting information that has been converted for the respective render data creating units and the print data; a display unit configured to display the render data created by the render data creating units; and a selection receiving unit configured to receive a selection of the render data.

6 Claims, 17 Drawing Sheets

(52) U.S. Cl.
CPC .......... *G06F 3/1208* (2013.01); *G06F 3/1242* (2013.01); *G06F 3/1259* (2013.01); *G06F 3/1264* (2013.01); *G06F 3/1282* (2013.01); *G06K 15/1822* (2013.01)

(58) Field of Classification Search
CPC .... G06F 3/1242; G06F 3/1259; G06F 3/1264; G06F 3/1282; G06F 3/1275
See application file for complete search history.

(56) References Cited

U.S. PATENT DOCUMENTS

| | | | |
|---|---|---|---|
| 2006/0139679 A1* | 6/2006 | Barry | G06F 3/1212 358/1.13 |
| 2007/0127064 A1* | 6/2007 | Kuroshima | G06F 3/1204 358/1.15 |
| 2008/0137139 A1* | 6/2008 | Yamada | G06F 3/1208 358/1.15 |
| 2009/0279125 A1 | 11/2009 | Liu et al. | |
| 2011/0038002 A1* | 2/2011 | Nakamura | G06F 3/121 358/1.15 |
| 2011/0255111 A1* | 10/2011 | Oba | G06F 3/1247 358/1.13 |
| 2011/0320964 A1* | 12/2011 | Gambhir | G06F 3/0481 715/756 |
| 2012/0287463 A1 | 11/2012 | Iida | |

* cited by examiner

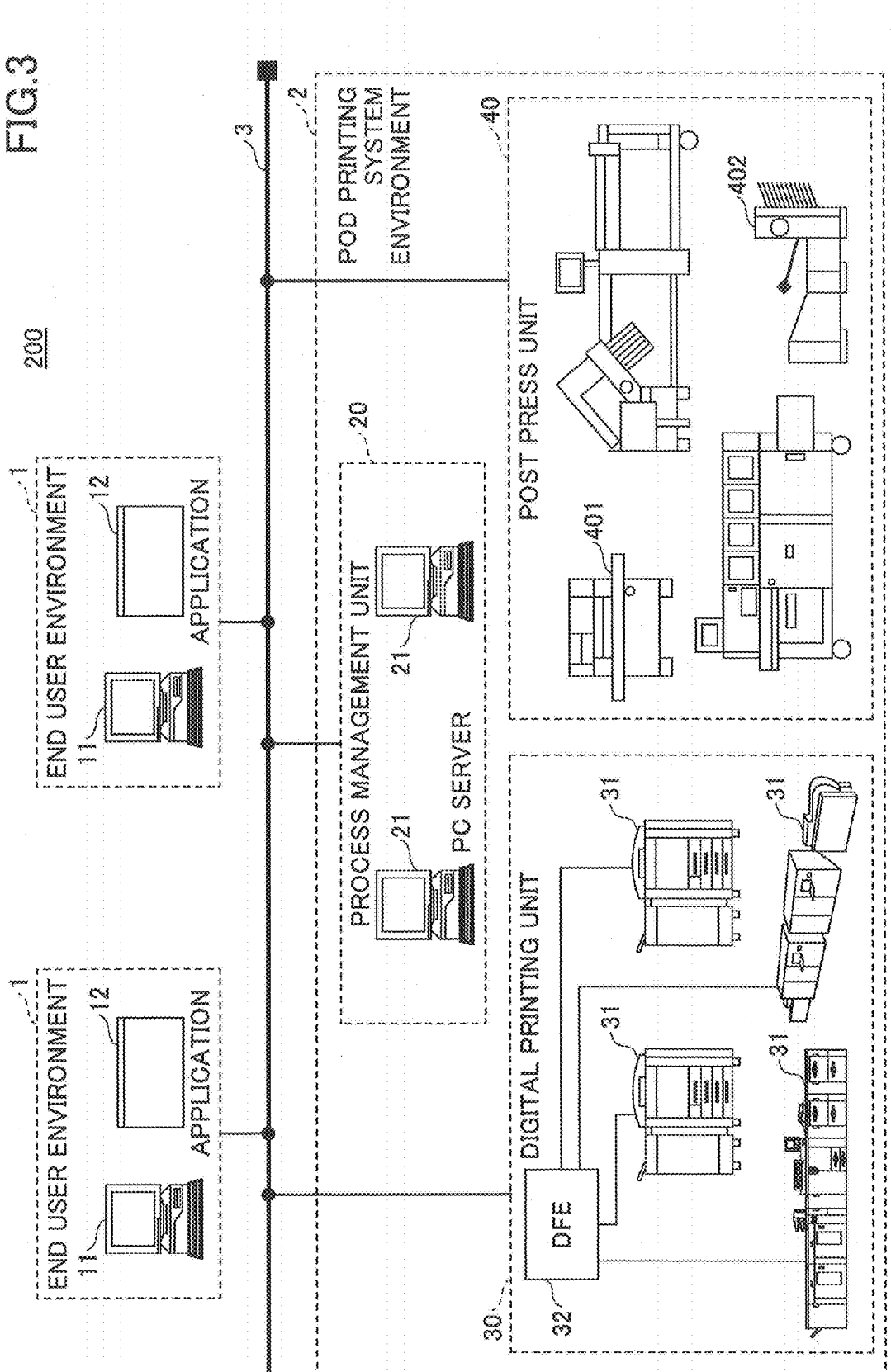

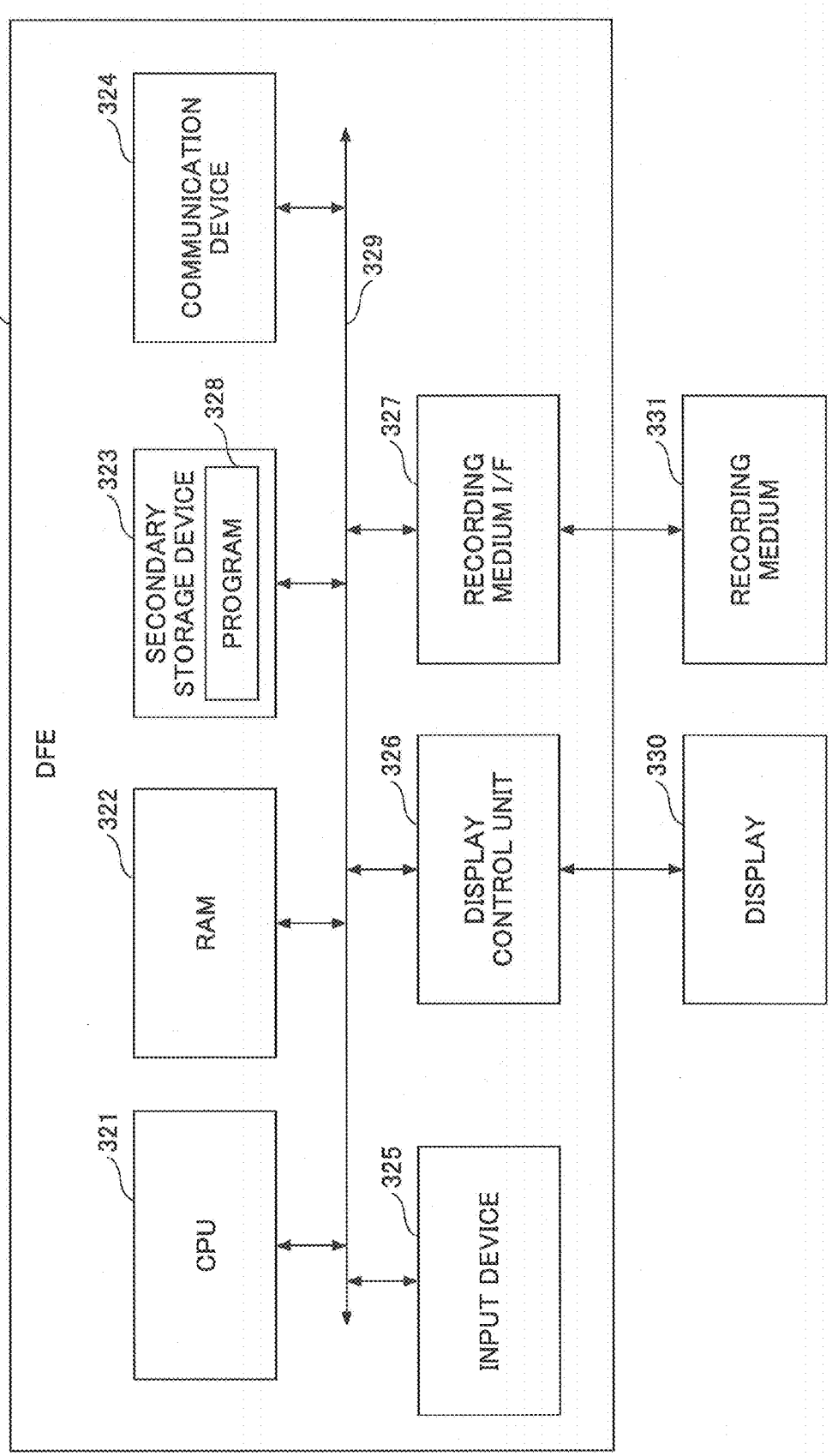

FIG. 5A

```
<JDF xmlns="http://www.CIP4.org/JDFSchema_1_1" xmlns:C="www.ccc.com/schema/ccc" ...>
  <ResourceLinkPool>
    <ComponentLink ... Amount = "2" ... />
  </ResourceLinkPool>
  <ResourcePool>
    <LayoutPreparationParams ... Rotate = "Rotate90" ... >
    </LayoutPreparationParams>
  </ResourcePool>
</JDF>
```

FIG. 5B

```
<JDF xmlns="http://www.CIP4.org/JDFSchema_1_1" xmlns:A="www.aaa.com/schema/aaa" ...>
  <ResourceLinkPool>
    <ComponentLink ... A:Amount = "2" ... />
  </ResourceLinkPool>
  <ResourcePool>
    <LayoutPreparationParams ... A:Rotate = "2" ... >
    </LayoutPreparationParams>
  </ResourcePool>
</JDF>
```

FIG.5C

```
<JDF xmlns="http://www.CIP4.org/JDFSchema_1_1" xmlns:B="www.bbb.com/schema/bbb" ...>
  <ResourceLinkPool>
    <ComponentLink ... B:DeliveryAmount="2" ... />
  </ResourceLinkPool>
  <ResourcePool>
    <LayoutPreparationParams ... B:AlternateRotation="false" ... B:Rotate="1">
    </LayoutPreparationParams>
  </ResourcePool>
</JDF>
```

FIG.6

```
<JDF xmlns="http://www.CIP4.org/JDFSchema_1_1" xmlns:DM="www.dummy.com/schema/ccc" ...>
  <ResourceLinkPool>
    <ComponentLink ... Amount="1" ... />
  </ResourceLinkPool>
  <ResourcePool>
    <LayoutPreparationParams ... Rotate="Rotate0" ...>
    </LayoutPreparationParams>
  </ResourcePool>
</JDF>
```

FIG.7A

| COMPANY C JDF | | JOB ATTRIBUTE IN DFE | |
|---|---|---|---|
| ATTRIBUTE NAME | VALUE | ITEM NAME | ITEM VALUE |
| Amount | | NUMBER OF COPIES | |
| | 1~32767 | | 1~32767 COPIES |
| Rotate | | ROTATION | |
| | Rotate0 | | 0° ROTATION |
| | Rotate90 | | 90° ROTATION |
| | Rotate180 | | 180° ROTATION |
| | Rotate270 | | 270° ROTATION |
| ... | | ... | |
| | ... | | ... |
| | ... | | ... |

FIG.7B

| COMPANY A JDF | | JOB ATTRIBUTE IN DFE | |
|---|---|---|---|
| ATTRIBUTE NAME | VALUE | ITEM NAME | ITEM VALUE |
| A:Amount | | NUMBER OF COPIES | |
| | 1~32767 | | 1~32767 COPIES |
| A:Rotate | | ROTATION | |
| | 1 | | 0° ROTATION |
| | 2 | | 90° ROTATION |
| | 3 | | 180° ROTATION |
| | 4 | | 270° ROTATION |
| ... | | ... | |
| | ... | | ... |
| | ... | | ... |

FIG.7C

| COMPANY B JDF | | JOB ATTRIBUTE IN DFE | |
|---|---|---|---|
| ATTRIBUTE NAME | VALUE | ITEM NAME | ITEM VALUE |
| B:DeliveryAmount | | NUMBER OF COPIES | |
| | 1~32767 | | 1~32767 COPIES |
| B:AlternateRotation | | ROTATION | |
| | true | | |
| | false | | |
| B:Rotate | | | |
| | 1 | | 0° ROTATION |
| | 2 | | 90° ROTATION |
| | 3 | | 180° ROTATION |
| | 4 | | 270° ROTATION |
| ... | | ... | |
| | ... | | ... |
| | ... | | ... |

FIG.9

| ITEM | | |
|---|---|---|
| Job INFORMATION | NUMBER OF COPIES | |
| Edit INFORMATION | ORIENTATION INFORMATION | |
| | PRINT SIDE INFORMATION | |
| | ROTATION | |
| | ENLARGE/REDUCE | |
| | IMAGE POSITION | OFFSET |
| | | POSITION ADJUSTMENT INFORMATION |
| | LAYOUT INFORMATION | CUSTOM/IMPOSITION ARRANGEMENT |
| | | NUMBER OF PAGES |
| | | IMPOSITION INFORMATION |
| | | PAGE ORDER INFORMATION |
| | | CREEP POSITION ADJUSTMENT |
| | MARGIN INFORMATION | |
| | CROP MARK INFORMATION | CENTER CROP MARK INFORMATION |
| | | CORNER CROP MARK INFORMATION |
| Finishing INFORMATION | Collate INFORMATION | |
| | STAPLING/BINDING INFORMATION | |
| | PUNCHING INFORMATION | |
| | CREASING INFORMATION | |
| | TRIMMING INFORMATION | |
| | OUTPUT TRAY INFORMATION | |
| | INPUT TRAY INFORMATION | |
| | COVER SHEET INFORMATION | |
| RIP CONTROL MODE (Page Mode or Sheet Mode) | | |

FIG.10

| ITEM | | |
|---|---|---|
| INPUT OUTPUT DATA TYPE INFORMATION | | |
| INPUT OUTPUT DATA READ WRITE POSITION SPECIFICATION METHOD INFORMATION | | |
| INPUT OUTPUT DATA READ WRITE POSITION INFORMATION | | |
| INPUT OUTPUT DATA READ WRITE EXECUTION MODE INFORMATION | | |
| UNIT INFORMATION (DIMENSION) | | |
| INPUT OUTPUT DATA COMPRESSION METHOD INFORMATION | | |
| RIP CONTROL MODE | | |
| INPUT OUTPUT IMAGE INFORMATION UNIT | INFORMATION RELEVANT TO OUTPUT IMAGE | IMAGE FORMAT TYPE |
| | | IMAGE FORMAT DIMENSION |
| | | IMAGE FORMANT RESOLUTION |
| | | POSITION OF IMAGE |
| | | COLOR SEPARATION INFORMATION |
| | | COLOR PLANE FIT POLICY INFORMATION |
| | | PLANE SHIFT INFORMATION |
| | | COLOR BIT NUMBER OF IMAGE FORMAT |
| | | IMAGE ORIENTATION INFORMATION |
| | | IMAGE FORMATION POSITION INFORMATION |
| | | IMAGE FORMATION SIZE INFORMATION |
| | | IMAGE FORMATION METHOD INFORMATION |
| | | COLOR ICC INFORMATION |
| | | FONT SUBSTITUTE INFORMATION |
| | | IMAGE FORMATION BASE POINT INFORMATION |
| | | FLAT K BLACK INFORMATION |
| | | RENDERING INFORMATION |
| | INFORMATION RELEVANT TO INPUT IMAGE | IMAGE FORMAT TYPE |
| | | IMAGE FORMAT DIMENSION |
| | | IMAGE FORMANT RESOLUTION |
| | | POSITION OF IMAGE |
| | | INPUT DATA |
| | | PAGE RANGE INFORMATION |
| | | COLOR ICC INFORMATION |
| | INFORMATION RELEVANT TO HANDLING OF IMAGE | SCALING OFFSET INFORMATION |
| | | OBJECT/AREA INFORMATION |
| | | HALFTONE INFORMATION |
| | | SCALING/ALGORITHM INFORMATION |
| INFORMATION RELEVANT TO PDL | DATA AREA | |
| | SIZE INFORMATION | |
| | ARRANGEMENT METHOD OF DATA | |

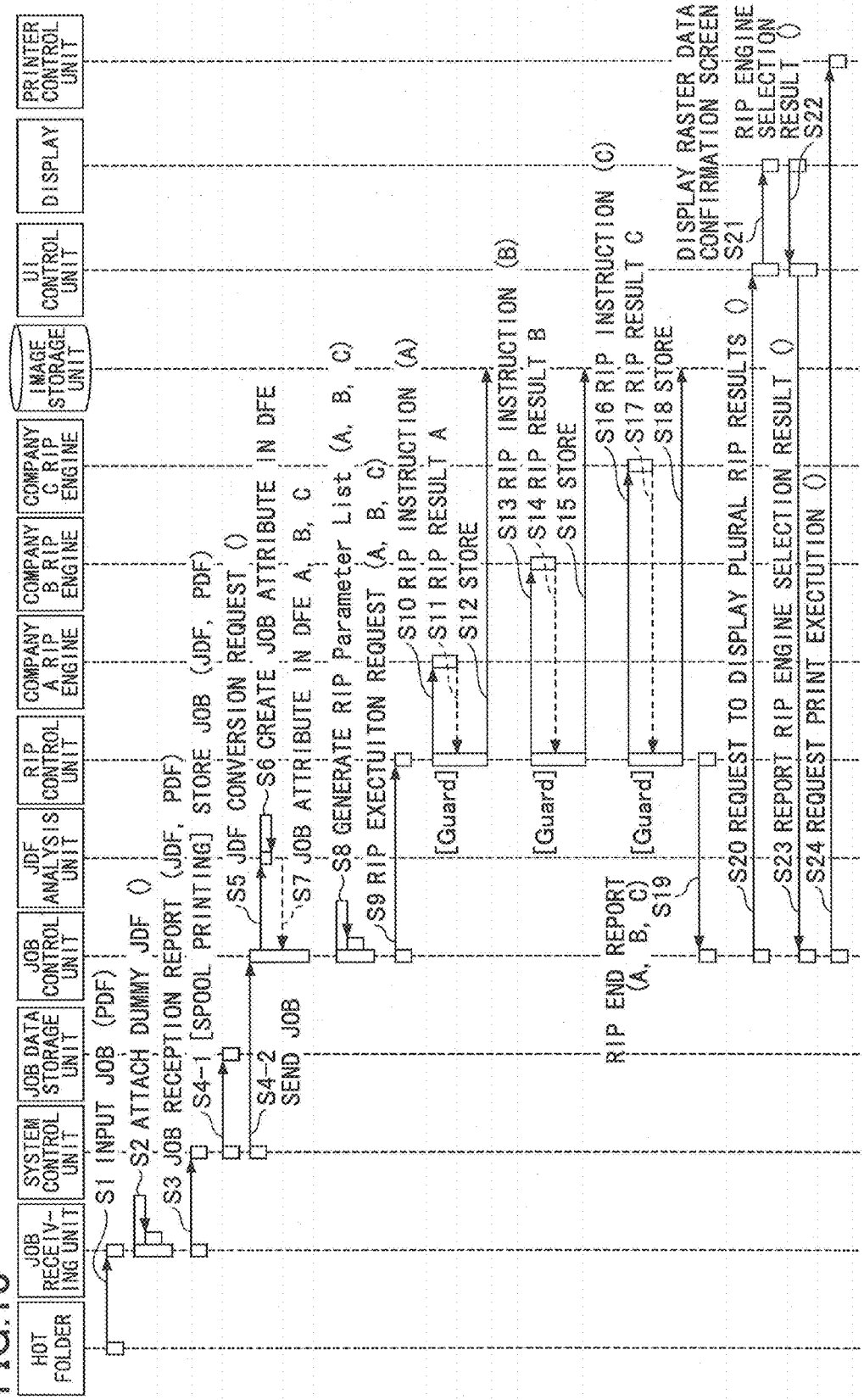

SIMULTANEOUS DISPLAY OF DIFFERENT FINISHING RESULTS OF MULTIPLE RENDER UNITS

CROSS-REFERENCE TO RELATED APPLICATIONS

This patent application is based on and claims priority pursuant to 35 U.S.C. § 119(a) to Japanese Patent Application Nos. 2014-030978, filed on Feb. 20, 2014, and 2015-026697, filed on Feb. 13, 2015 and in the Japan Patent Office, the entire disclosures of which are hereby incorporated by reference herein.

BACKGROUND OF THE INVENTION

1. Field of the Invention

The present invention relates to an information processing device that acquires a print job including print data and setting information, and that creates render data.

2. Description of the Related Art

There is known a technology referred to as production printing, for printing a large amount of documents for business purposes and binding books (see, for example, Patent Document 1). Patent Document 1 discloses a printing system that can report to the user as to whether a post process can be used, in consideration of the entire printing system.

In production printing, the printing process is often handled as a workflow. Printing workflows are increasingly being opened to the public. By opening the printing workflow, software (workflow applications described below) and printing devices of various companies can describe, by a common description method, the settings of the print jobs in main processes of printing. As a format for describing all process of the print workflow, there is known a standard format referred to as the JDF (Job Definition Format).

As processes of the workflow, there are various processes such as creating documents and content, specifying the printing method, printing, and a post process. These processes are performed by various workflow applications and printing devices. However, regardless of the difference in the manufacturers of the workflow applications and the printing devices, the JDF makes it possible for the printing devices to cooperate with each other and to manage the printing processes.

However, there are cases where the workflow applications and the printing devices extend the JDF. In this case, the JDF created by the workflow applications of the respective companies may include descriptions unique to the corresponding workflow application. In this case, the workflow applications and printing devices of lower-level processes cannot analyze the JDF and perform the process.

Therefore, the workflow applications and printing devices of lower-level processes determine the manufacturer of the workflow application that has created the JDF, by analyzing the JDF. Accordingly, even when the JDF has been extended, it is possible execute a process of itself (for example, a render process) in the printing workflow by the respective workflow applications and printing devices of lower-level processes. One example is to perform the render process (create raster data) by a rendering engine suited to the workflow application that has created the print job.

However, the determination result of the manufacturer of the workflow application that has created the JDF may not always be appropriate. Furthermore, when the JDF has been created by an unknown workflow application, the workflow applications and printing devices of lower-level processes may not be able to determine the manufacturer of the workflow application that has created the JDF. In these cases, the raster data created by the render process may be different from what the user had intended, and a large amount of documents of this unintended render data may be printed.

Patent Document 1: Japanese Laid-Open Patent Publication No. 2012-238188

SUMMARY OF THE INVENTION

The present invention provides an information processing device and an information processing method, in which one or more of the above-described disadvantages are eliminated.

According to an aspect of the present invention, there is provided an information processing device for creating render data by using a print job including print data and setting information, the information processing device including a conversion unit configured to convert the setting information into device setting information for each of a plurality of render data creating units; the render data creating units being configured to create the render data from the print data and the device setting information; a render control unit configured to cause the render data creating units to respectively create the render data by using the device setting information that has been converted for the respective render data creating units and the print data; a display unit configured to display, on a display, the render data created by the render data creating units; and a selection receiving unit configured to receive a selection of the render data.

According to an aspect of the present invention, there is provided an information processing method for creating render data by using a print job including print data and setting information, the information processing method including converting the setting information into device setting information for each of a plurality of render data creating units; creating, by the render data creating units, the render data from the print data and the device setting information; causing the render data creating units to respectively create the render data by using the device setting information that has been converted for the respective render data creating units and the print data; displaying, on a display, the render data created by the render data creating units; and receiving a selection of the render data.

According to an aspect of the present invention, there is provided a non-transitory computer-readable recording medium storing a program implementing an information processing device for creating render data by using a print job including print data and setting information, wherein the program causes a computer to execute a process, the process including converting the setting information into device setting information for each of a plurality of render data creating units; creating, by the render data creating units, the render data from the print data and the device setting information; causing the render data creating units to respectively create the render data by using the device setting information that has been converted for the respective render data creating units and the print data; displaying, on a display, the render data created by the render data creating units; and receiving a selection of the render data.

BRIEF DESCRIPTION OF THE DRAWINGS

Other objects, features and advantages of the present invention will become more apparent from the following detailed description when read in conjunction with the accompanying drawings, in which:

FIG. 3 illustrates an example of the overall configuration of a printing system;

FIG. 4 illustrates a hardware configuration of the DFE;

FIGS. 5A through 5C illustrate examples of parts of descriptions in the JDF;

FIG. 6 illustrates an example of a dummy JDF;

FIGS. 7A through 7C illustrate examples of conversion tables;

FIG. 9 schematically illustrates an example of the "job attributes in DFE";

FIG. 10 illustrates an example of a "RIP Parameter List";

FIG. 13 is an example of a sequence diagram indicating the operation procedures of DFE;

DETAILED DESCRIPTION OF THE PREFERRED EMBODIMENTS

A description is given, with reference to the accompanying drawings, of embodiments of the present invention.

First Embodiment

Figure 1:
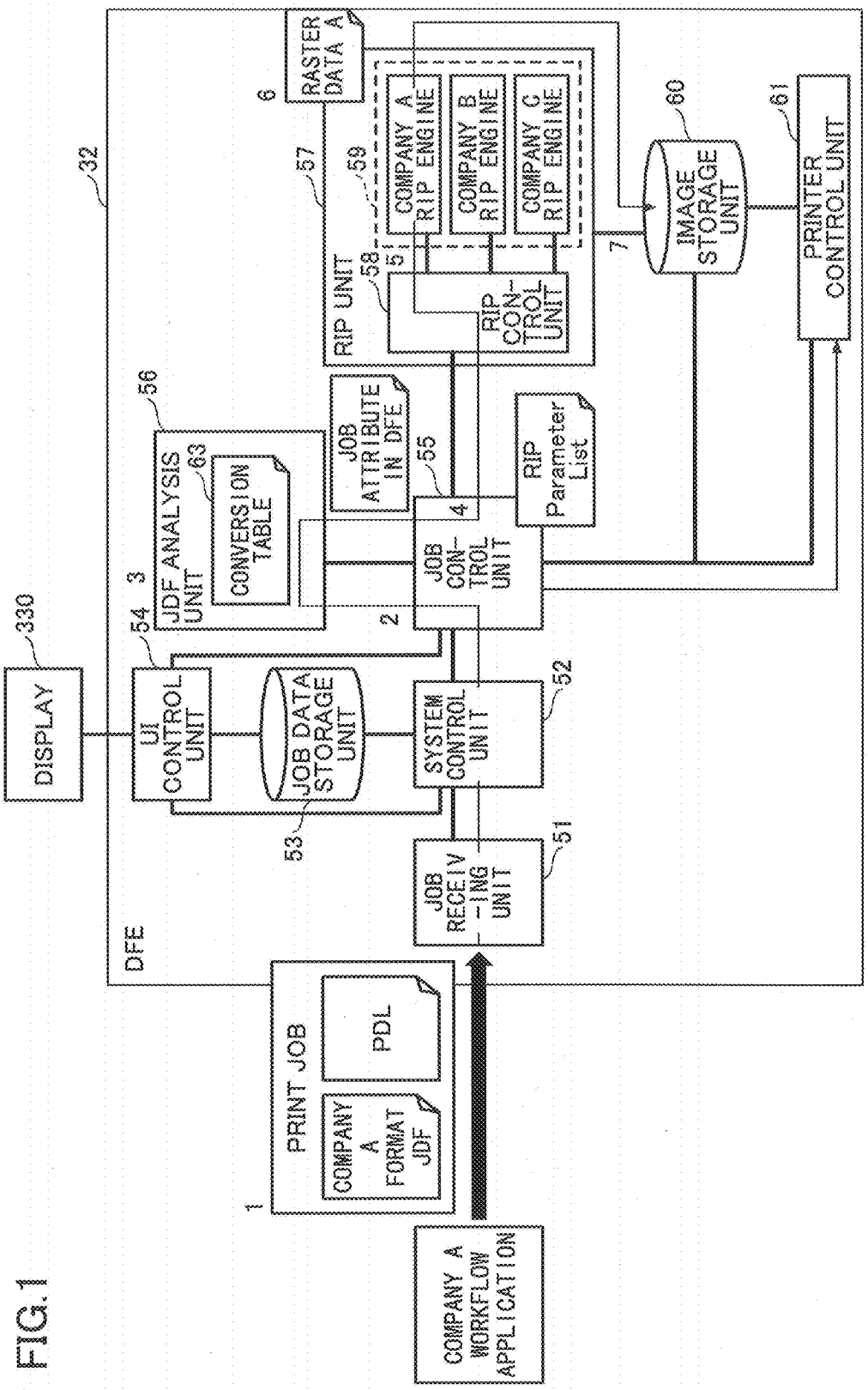
FIG. 1 schematically illustrates functional blocks and operations of a DFE indicated for purposes of comparison.

FIG. 1 schematically illustrates functional blocks and operations of a DFE (Digital Front End) 32 indicated as matter of comparison. The configuration and operations of the DFE 32 illustrated in FIG. 1 are merely a comparison example for describing the feature parts of the present embodiment, and it is to be noted that this comparison example is not a known example or a conventional example. Details of the DFE 32 are described below.

1. A job receiving unit 51 receives a print job created by a workflow application of company A (company A format JDF+PDL). The company A format JDF is the JDF that has been extended by company A. PDL (Page Description Language) is a language for specifying the render contents of a page image (rasterized image); however, in this example, PDL means data described in PDL. Examples of PDL are PDF (Portable Document Format), PostScript, PCL, and RPDL.

2. A print job is output to a job control unit 55 via a system control unit 52. The job control unit 55 outputs the JDF to a JDF analysis unit 56.

3. The JDF analysis unit 56 analyzes the company A format JDF and determines that the JDF has been created by a workflow application of company A. Then, the JDF analysis unit 56 converts the company A format JDF into a "job attribute in DFE" that can be handled by the DFE 32. A "job attribute in DFE" is an example of device setting information. The "job attribute in DFE" is described below; for example, the "job attribute in DFE" is obtained by converting each attribute of the print job into a format that can be handled by the DFE 32 of company C. Note that the manufacturer of the workflow application creates a print job assuming that the print job is executed in a RIP engine 59. Therefore, determining the manufacturer of the workflow application that has created the JDF is substantially the same meaning as determining the RIP engine 59 in which the print job is assumed to be rendered.

4. The job control unit 55 generates a "RIP Parameter List" from the "job attribute in DFE" and the PDL, and outputs the "RIP Parameter List" to a RIP unit 57. A "RIP Parameter List" is an assembly of information needed for performing a RIP process at the RIP engine 59. The job control unit 55 determines an instruction for a RIP process to the RIP engine 59, based on information in the "RIP Parameter List". This instruction is referred to as a RIP command.

5. A RIP control unit 58 uses the determination results obtained by the JDF analysis unit 56 (or makes a determination by itself), to output the "RIP Parameter List" to a company A RIP engine.

6. The company A RIP engine executes a raster process based on the "RIP Parameter List", and creates raster data (bit map data).

7. The RIP unit 57 stores the raster data in an image storage unit 60 after the render process has ended. A printer control unit 61 sends the raster data stored in the image storage unit 60 to a printer described below, and executes printing.

As described above, the JDF analysis unit 56 determines the manufacturer of the workflow application that has created the JDF; then it is possible to convert the JDF into "job attribute in DFE" suited to the DFE 32, in which the RIP engines 59 of the respective manufacturers of workflow applications are included, and therefore printing can be performed by using the optimum RIP engine 59.

Meanwhile, there are cases where the print job does not include the JDF. When the JDF is not provided, it is not possible to determine the manufacturer of the workflow application that has created the print job, and therefore the workflow applications and printing devices of lower-level processes can neither convert the JDF into a format that the company itself can handle, nor select an optimum engine. A case where the JDF is not provided means, for example, a case where the print job is provided by a hot folder (a folder for inputting a print job set in advance; when the print job is present in this folder, the workflow application automatically performs a defined process), or a detachable memory card. The workflow application often creates the JDF, and therefore when the user sets a print job by a hot folder or a USB memory, there may be cases where there is no JDF or the user forgets to input the JDF.

Furthermore, even when the JDF is provided, when the JDF is created by an unknown workflow application, the JDF analysis unit 56 may not be able to determine the manufacturer of the workflow application that has created the JDF.

In order to respond to the above inconveniences, the DFE 32 according to the present embodiment operates as follows.

Figure 2:
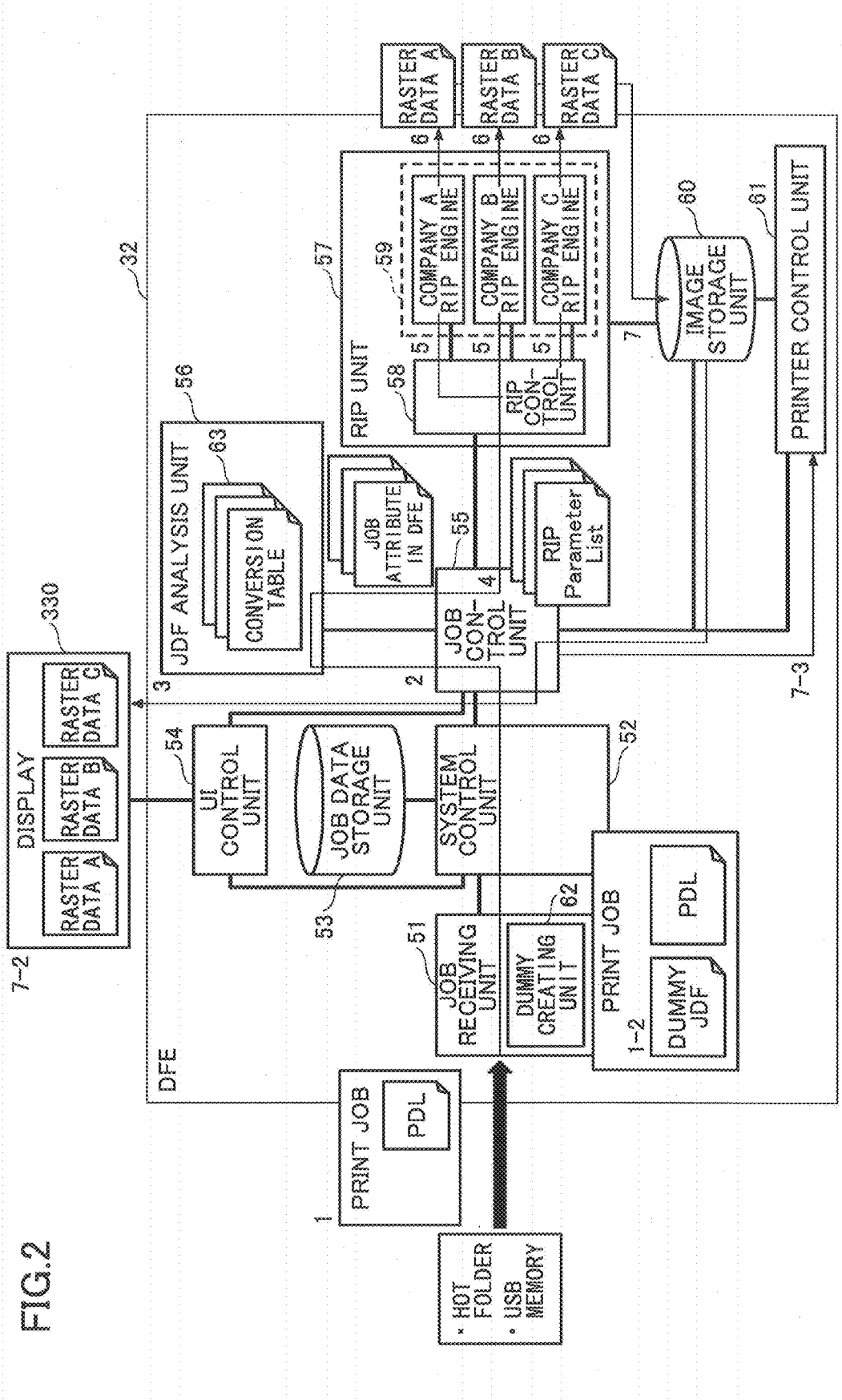
FIG. 2 schematically illustrates functional blocks and operations of a DFE (first embodiment)

FIG. 2 schematically illustrates functional blocks and operations of a DFE according to the present embodiment.

1. The job receiving unit 51 receives a print job (PDL) from an input source that does not attach the JDF to the print job, such as a hot folder or a USB memory.

1-2. When the print job does not include the JDF, a dummy creating unit 62 creates a dummy JDF.

2. The print job is output to the job control unit 55 via the system control unit 52. The job control unit 55 outputs the dummy JDF to the JDF analysis unit 56.

3. When the JDF analysis unit 56 detects the dummy JDF, the JDF analysis unit 56 converts the dummy JDF into "job attributes for DFE", corresponding to the number of types of the RIP engines 59. That is to say, the RIP engine 59 by which the PDL is assumed to be printed is unclear, and therefore the "job attribute in DFE" is created for all of the RIP engines 59 such that any RIP engine 59 can be used for outputting the PDL.

4. The job control unit 55 generates three "RIP Parameter Lists" from the PDL and three "Job attributes for DFE", and outputs the "RIP Parameter Lists" to the RIP unit 57 (a "job attribute in DFE" is created for each render data creating means".

5. The RIP control unit 58 outputs the "RIP Parameter List" for company A to the company A RIP engine, outputs the "RIP Parameter List" for company B to the company B RIP engine, and outputs the "RIP Parameter List" for company C to the company C RIP engine.

6. The company A RIP engine, the company B RIP engine, and the company C RIP engine respectively execute render processes based on the corresponding "RIP Parameter Lists", and create raster data A through C.

7. The RIP unit 57 stores the raster data A through C in an image storage unit 60 after the raster process has ended.

7-2. The job control unit 55 displays the raster data A through C on a display 330, via a UI control unit 54. Accordingly, the user is able to confirm which RIP engine 59 has created the raster data having a desired finish, before printing the data. The user inputs the selection result of the RIP engine 59 in the UI control unit 54. The selection of the RIP engine 59 may be expressed as the selection of the raster data or as the manufacturer of the workflow application.

7-3. The job control unit 55 outputs the selection result reported from the UI control unit 54, to the printer control unit 61. The printer control unit 61 sends the raster data, which is selected from among the three raster data items stored in the image storage unit 60, to the printer, and executes printing.

As described above, in the present embodiment, when the print job does not include the JDF, a dummy JDF is created, a number of raster data items are created corresponding to the number of types of the RIP engine 59, and the created raster data items are displayed on the display 330. Therefore, the user can select the appropriate RIP engine 59 and execute the printing.

Configuration Example

FIG. 3 illustrates an example of the overall configuration of a printing system 200 according to the present embodiment. The printing system 200 according to the present embodiment includes at least one end user environment 1 and a POD (Print On Demand) printing system environment 2, which are connected via a network 3 such as a LAN and the Internet.

In the end user environment 1, a client PC 11 is arranged. In the client PC 11, a workflow application (hereinafter, simply referred to as "application") 12 for the POD printing operation is installed. The client PC 11 can receive the operation of the user and generate a print job.

The application 12 can execute a combined printing function (Number Up page fitting function) for pasting a plurality of logical page images onto a sheet, and an image editing function of adding a header, a footer, and a page number to the sheet. Furthermore, the application 12 can specify a punching instruction for opening holes in the sheet and a stapling instruction, for bookbinding printing. These instructions and settings are described in the JDF. The JDF may be referred to as a job ticket, an operation instruction, or a print instruction.

The POD printing system environment 2 includes a process management unit 20, a digital printing unit 30, and a post press unit 40, which are connected by the network 3. The process management unit 20 instructs performing an operation with respect to each of the processes of the digital printing unit 30 and the post press unit 40 in the POD printing system environment 2, and manages the workflows of the POD printing system environment 2 in a unified manner.

The process management unit 20 receives a print job (JDF and PDL) from the end user environment 1, and stores the print job. JDF is an example of setting information. PDL is an example of print data.

Furthermore, the process management unit 20 can also construct, as a workflow, the operation in each process based on the print job from the end user environment 1; efficiently schedule the digital printing unit 30, the post press unit 40, and the operations of the operator; and send a report to the operator according to need when an error occurs during automatic operation. Generally, the process management unit 20 is constituted to include at least one PC server 21.

The process management unit 20 sends the print job to the digital printing unit 30 and executes printing. Furthermore, the printed matter is conveyed to the post press unit 40, and the post press unit 40 performs bookbinding according to an instruction from the process management unit 20. Note that the print job may be directly sent from the digital printing unit 30 to the post press unit 40.

The digital printing unit 30 is constituted to include various types of printers 31 (a printer device such as a printer for production, a high speed color inkjet printer, and a color/monochrome MFP). In the digital printing unit 30, the DFE 32 is arranged. The DFE 32 is also referred to as a printer control device, and controls the printing by the printer 31. The DFE 32 may be a separate body from the printer 31 as illustrated in FIG. 3, or may be integrated with the printer 31 as a single body. When the DFE 32 acquires a print job from the process management unit 20, the DFE 32 uses the JDF and the PDL to generate raster data (an example of render data) for forming an image with toner or ink by the printer 31, and sends the raster data to the printer 31.

The digital printing unit 30 includes various types of printers 31. Note that the digital printing unit 30 may include a printer 31 that is directly connected to a finisher (post process device) for performing post processes such as creasing, saddle stitching bookbinding, case work, and punching with respect to the recording sheet that has undergone printing.

The post press unit 40 is constituted to include post processes devices such as a creaser, a saddle stitching bookbinding device, a case work device, a sheet cutting device, an inserter, and a sorting device, according to operation instructions for printed matter (post press job) received from the process management unit 20. Furthermore, the post press unit 40 executes finishing processes such as creasing, saddle stitching bookbinding, case work, cutting, inserting, a sorting with respect to the printed matter output by the digital printing unit 30. The post press unit 40 includes post process devices for performing post processes after digital printing, such as a stapler 401 and a punching device 402.

The end user of the end user environment 1 uses the application 12 for a POD printing operation from the client PC 11, to give instructions to perform image editing, page fitting, text inserting, and post processing, and sends the print job to the process management unit 20 of the POD printing system environment 2.

A PC server 21 of the process management unit 20 gives a printing instruction to the digital printing unit 30, and gives a post processing instruction to the post press unit 40, according to the JDF.

[Hardware Configuration]

In the present embodiment, the process management unit 20 receives the print job created by the end user environment 1, and the process management unit 20 sends the print job to the DFE 32. The functions of the DFE 32 according to the present embodiment may not necessarily be performed by the DFE 32, and may be performed by another device in the network. However, in the present embodiment, it is assumed that the DFE 32 has the functions of creating a dummy JDF and a render process by the RIP engine 59.

FIG. 4 illustrates a hardware configuration of the DFE 32. The DFE 32 is realized by a hardware configuration as illustrated in, for example, FIG. 4. That is to say, the DFE 32 has a function of an information processing device (computer). The DFE 32 includes CPU 321, a RAM 322, a secondary storage device 323, a communication device 324, an input device 325, a display control unit 326, and a recording medium I/F 327, which are interconnected by a bus 329.

The CPU 321 controls the entire DFE 32 by executing programs by using the RAM 322 as a work memory. The secondary storage device 323 is a non-volatile memory such as a HDD (Hard Disk Drive) and a SSD (Solid State Drive). The secondary storage device 323 stores a program 328 having a function of converting the print jobs.

The communication device 324 is a modem, a LAN card, etc., and communicates with the end user environment 1, the process management unit 20, or the post press unit 40 by connecting to the network 3. Furthermore, the communication device 324 communicates with the printer 31. The input device 325 is a device that receives operations by the user, such as a keyboard or a mouse. The display control unit 326 is connected to the display 330, and displays screens on the display 330 according to instructions from the CPU 321. Note that the display 330 may be a touch panel. The display 330 is an example of a display unit.

The recording medium I/F 327 is used for detachably inserting a portable recording medium, and the recording medium I/F 327 writes data in a recording medium 331 and reads data from the recording medium 331 according to instructions from the CPU 321. The recording medium 331 may be, for example, various kinds of media such as a medium for optically, electrically, or magnetically recording information such as a CD-ROM, an optical disk, a USB memory, an SD card (registered trademark), or a semiconductor memory for electrically recording information such as a flash memory.

Note that the program 328 may be distributed in a state of being stored in the recording medium 331, or may be downloaded from a server (not illustrated) via the network 3.

Furthermore, the hardware configuration of the client PC 11 of the end user environment 1 and the PC server 21 of the process management unit 20 may also be realized by the same configuration as that of FIG. 4.

[Functions of DFE]

Next, with reference to FIG. 2, a description is given of the functions of the DFE 32. The DFE 32 performs job control in a printing workflow, RIP (Raster Image Processor) control, and printer control. As described above, the DFE 32 operates as a server for providing the main functions of printing, to the end user environment 1 and the process management unit 20. Note that job control means a series of control operations of the procedures of the print job, such as receiving a print job, analyzing the JDF, creating raster data, and printing by the printer 31. RIP control means to create the "job attribute in DFE", and subsequently create the "RIP Parameter List", and cause the RIP engine 59 to create raster data. "RIP" is an abbreviation of "Raster Image Processor", and means an exclusive-use IC for creating raster data, and to create raster data. Printer control means to send, to the printer 31, the raster data and part of the "job attribute in DFE" (finishing information described below), and to cause the printer to perform printing.

In the following, a description is given based on FIG. 2. The DFE 32 includes the job receiving unit 51, the system control unit 52, the UI control unit 54, the job control unit 55, the JDF analysis unit 56, the RIP unit 57, the RIP control unit 58, the RIP engine 59, and the printer control unit 61. These units are realized as the CPU 321 executes the program 328 and cooperates with various hardware elements including those of FIG. 4. Furthermore, the DFE 32 includes a job data storage unit 53 and the image storage unit 60 which are constructed in the secondary storage device 323, the RAM 322, and the recording medium 331.

The job receiving unit 51 receives a print job. The job receiving unit 51 records a log by recording, for example, a unique job number, the reception date, the end date, and the status in association with the print job. The print job is received by, for example, three paths as indicated below.

i) Receive the print job from the application 12, etc., via the network 3.

ii) The job receiving unit 51 reads the print job stored in the recording medium 331.

iii) The job receiving unit 51 detects and reads the print job stored in a hot folder.

In the present embodiment, the target is a print job in which the JDF is not included, among the print jobs mainly received by the paths of ii) and iii). However, the present embodiment is also appropriately applicable to a print job in which the JDF is not included, even when the print job is received by the path of i). Furthermore, the present embodiment is also appropriately applicable to a print job in which the JDF is not included, even when the print job is received by a path other ii) or iii). Furthermore, the present embodiment is also appropriately applicable even in a case where only the PDL is sent from an arbitrary PC.

The dummy creating unit 62 creates a dummy JDF when it is detected that the received print job does not include a JDF. A dummy JDF is described below, including a general-purpose tag (attribute) and a standard attribute (an example of a setting value). The job receiving unit 51 outputs, to the system control unit 52, a print job (JDF+PDL) or (dummy JDF+PDL).

The system control unit 52 stores the received print job in the job data storage unit 53, or outputs the received print job to the job control unit 55. For example, when it is set in the DFE 32 to store the print job in the job data storage unit 53 in advance, the system control unit 52 stores the print job in the job data storage unit 53. Furthermore, for example, when it is described in the JDF whether to store the print job in the job data storage unit 53, the storage of the print job is determined according to the description in the JDF.

Furthermore, when the user has performed an operation of displaying the contents of the print job stored in the job data storage unit 53 in, for example, the display 330, the system control unit 52 outputs the JDF from the job data storage unit 53 to the UI control unit 54. When the user has changed the JDF, the UI control unit 54 receives the changed contents, and the system control unit 52 stores the changed JDF in the job data storage unit 53 again.

Furthermore, when the system control unit 52 receives an instruction to execute a print job from the user, the end user environment 1, or the process management unit 20, the system control unit 52 outputs the print job stored in the job data storage unit 53 to the job control unit 55. Furthermore, for example, when a print time is set in the JDF, the system control unit 52 outputs the print job stored in the job data storage unit 53 to the job control unit 55 at the print time.

The job data storage unit 53 is a storage area for storing a print job as described above, and the job data storage unit 53 is provided in the secondary storage device 323 or the recording medium 331 of the DFE 32. Furthermore, the job data storage unit 53 may be provided in a storage device (not illustrated) in the network.

The UI control unit 54 interprets the JDF and displays the contents of the print job on the display 330. Furthermore, in the present embodiment, the raster data created by the RIP engine 59 is displayed in the display 330. Furthermore, the UI control unit 54 receives a selection of the RIP engine 59 by the user, and reports the selection to the job control unit 55.

The job control unit 55 causes the RIP control unit 58 to create raster data, and causes the printer control unit 61 to perform printing. Specifically, first, the JDF or the dummy JDF of the print job is sent to the JDF analysis unit 56, together with a JDF conversion request.

The JDF analysis unit 56 acquires a JDF or a dummy JDF and a JDF conversion request from the job control unit 55. The JDF analysis unit 56 analyzes the description of the JDF and determines the manufacturer (or optimum RIP engine for the JDF) of the application 12 that has created the JDF. The JDF analysis unit 56 uses a conversion table 63 prepared for the manufacturer of the application 12, to convert the JDF into a "job attribute in DFE" that can be handled by the DFE 32. That is to say, the DFE 32 of company C does not only handle the JDF created by an application of company C; when the JDF has been created by an application of company A or company B, the JDF is converted into a "job attribute in DFE" that can be handled by the DFE 32 of company C.

Furthermore, when a dummy JDF has been output from the job control unit 55, the JDF analysis unit 56 creates a number of "job attributes in DFE" corresponding to the number of the RIP engines 59 (the number of conversion tables).

Note that when the JDF analysis unit 56 creates the "job attribute in DFE", the JDF analysis unit 56 sets a "RIP control mode" in the "job attribute in DFE". The "RIP control mode" is described below; the "RIP control mode" includes a "Page Mode" and a "Sheet Mode". It is determined in advance whether the print job of each company is created by the "Page Mode" or the "Sheet Mode". Thus, when the manufacturer of the application 12 that has created the JDF is determined, the "RIP control mode" can be determined. In the present embodiment, it is assumed that the DFE 32 handles the setting of combined printing of the print job by the "Page Mode" (the "Page Mode" is the default mode).

Accordingly, the job control unit 55 that has acquired the "job attribute in DFE" converts the "job attribute in DFE" and the PDL into the "RIP Parameter List", and outputs the print job in the form of the "RIP Parameter List" to the RIP control unit 58.

In the present embodiment, when the dummy JDF has been created, the job control unit 55 create a number of "RIP Parameter Lists" corresponding to the number of "job attributes in DFE", i.e., the number of RIP engines 59. The job control unit 55 causes the RIP control unit 58 to perform a render process using the RIP engine 59, and to create raster data.

The "RIP Parameter List" includes a "RIP control mode". The RIP control unit 58 controls the RIP engine 59 according to the "RIP control mode". Therefore, a sequence is determined by the "RIP control mode".

"Page Mode" . . . Create raster data in which plural pages are combined into a single page, by instructing a RIP process for each of the plural pages.

"Sheet Mode" . . . Create raster data by instructing a RIP process for each part (each part corresponds to each of the plural pages before being combined) of a single page in which the plural pages have already been combined.

The RIP unit 57 includes the RIP control unit 58 and the RIP engine 59, and creates the raster data by these units. The RIP control unit 58 analyzes the information in the "RIP Parameter List" and determines the RIP engine 59 to be used, from among the plurality of RIP engines 59. The RIP engine 59 may be determined based on one or more items in the "RIP Parameter List" or based on RIP engine identification information clearly indicated in the "RIP Parameter List". For example, the RIP engine 59 is determined based on descriptions such as xmlns:A="www.aaa.com/schema/aaa" and xmlns:B="www.bbb.com/schema/bbb" in the "RIP Parameter List". Furthermore, for example, when the job control unit 55 has clearly indicated the RIP engine identification information in the "RIP Parameter List", the RIP engine 59 instructed by the RIP engine identification information is selected. The RIP control unit 58 refers to the "RIP Parameter List" and sends a RIP command to the selected RIP engine 59.

Furthermore, the RIP control unit 58 refers to the "RIP Parameter List", and when the "RIP control mode" is "Sheet Mode", the RIP control unit 58 outputs a RIP command to the RIP engine 59 according to the "Sheet Mode". Accordingly, the difference between print jobs can be compensated for.

The RIP engine 59 is a rendering engine, and creates raster data by performing rasterization according to the RIP command.

The image storage unit 60 is a storage unit in which the created raster data is stored. When a dummy JDF is created, a plurality of raster data items are stored with respect to a single print job. For example, the image storage unit 60 is installed in the secondary storage device 323. Alternatively, the image storage unit 60 may be installed in a storage device in the network.

The printer control unit 61 is connected to the printer 31, and reads the raster data stored in the image storage unit 60 and sends the raster data to the printer 31 to print the raster data. Furthermore, the printer control unit 61 performs a finishing process based on finishing information acquired from the job control unit 55.

[Determination of JDF and Manufacturer of Application that Created JDF]

The JDF is described in XML (Extensible Markup Language). XML is a standard of structured text for structuring a document by applying meanings to tags.

FIGS. 5A through 5C illustrate examples of parts of descriptions in the JDF. The JDF in FIG. 5A is assumed to be created by the application 12 of company C. In the JDF, instructions with respect to the print job are described. The following description indicates a JDF ticket complying with CIP4.

JDF xmlns="http://www.CIP4.org/JDFSchema_1_1"

The following description indicates a JDF tag definition, which has been uniquely extended by each printing company/vendor not complying with CIP4. In this example, all tags starting with "C:" in the JDF become extended tags.

xmlns:C="www.ccc.com/schema/ccc"

"ResourcePool" defines an assembly of attributes for realizing the printing.

"LayoutPreparationParams" is one of the attributes defined in "ResourcePool", and defines an attribute relevant to page fitting.

"ResourceLinkPool" defines an assembly of references to an attribute that is commonly used in "ResourcePool" with respect to a particular range in a job, when attributes are different in the particular range in the job such as between pages.

"ComponentLink" is one of the definitions of reference in "ResourceLinkPool", and specifies the reference and information of the attribute relevant to the output matter.

"Amount" specifies the number of copies.

"Rotate" specifies the rotation angle of the image.

FIG. 5B illustrates an example of an extension of company A, and FIG. 5C illustrates an example of an extension of company B. In FIG. 5B, xmlns:A="www.aaa.com/schema/aaa" means that all tags starting with "A:" in the JDF become extension tags of company A. In FIG. 5C, xmlns:B="www.bbb.com/schema/bbb" means that all tags starting with "B:" in the JDF become extension tags of company B.

Therefore, by referring to these descriptions in the JDF, the JDF analysis unit 56 is able to identify the manufacturer of the application 12 that has created the JDF. By using the conversion table 63 described below, according to the manufacturer of the application 12, it is possible to convert the JDF into the "job attribute in DFE" that can be handled by the DFE 32 of company C.

When the JDF is not included in the print job, there is no information such as the number of copies to be printed or the rotation angle, and therefore the DFE 32 cannot perform printing. However, there may be cases where the user wants to perform printing even if these information items are incorrect (even if these information items do not completely match the intensions of the user). Therefore, the dummy creating unit 62 creates a dummy JDF.

FIG. 6 illustrates an example of a dummy JDF.

In the dummy JDF of FIG. 6, xmlns: DM="www.dummy.com/schema/ccc" indicates an extended RIP parameter list tag definition similar to the JDF; however, this description indicates that a tag starting with "DM:" is a dummy JDF. The JDF analysis unit 56 refers to the JDF tag definition, and detects that this JDF is a dummy JDF. Note that as long as it can be understood that the JDF is a dummy JDF, the distinction may be made between a JDF and a dummy JDF by descriptions other than a tag starting with "DM:".

Furthermore, the dummy JDF does not originally include information such as the number of copies, and therefore the dummy creating unit 62 sets a standard attribute value. For example, the dummy creating unit 62 sets "1" for the number of copies and sets "0" for the rotation angle. The standard attribute values are defined in advance, and therefore the dummy JDF can be created in advance, and the dummy creating unit 62 only needs to attach the dummy JDF created in advance to the PDL.

Furthermore, the dummy JDF of FIG. 6 is created based on the JDF of FIG. 5A; however, the dummy JDF may be created based on the JDF of FIG. 5B or 5C.

[Creation of Job Attribute in DFE]

Figure 8A:
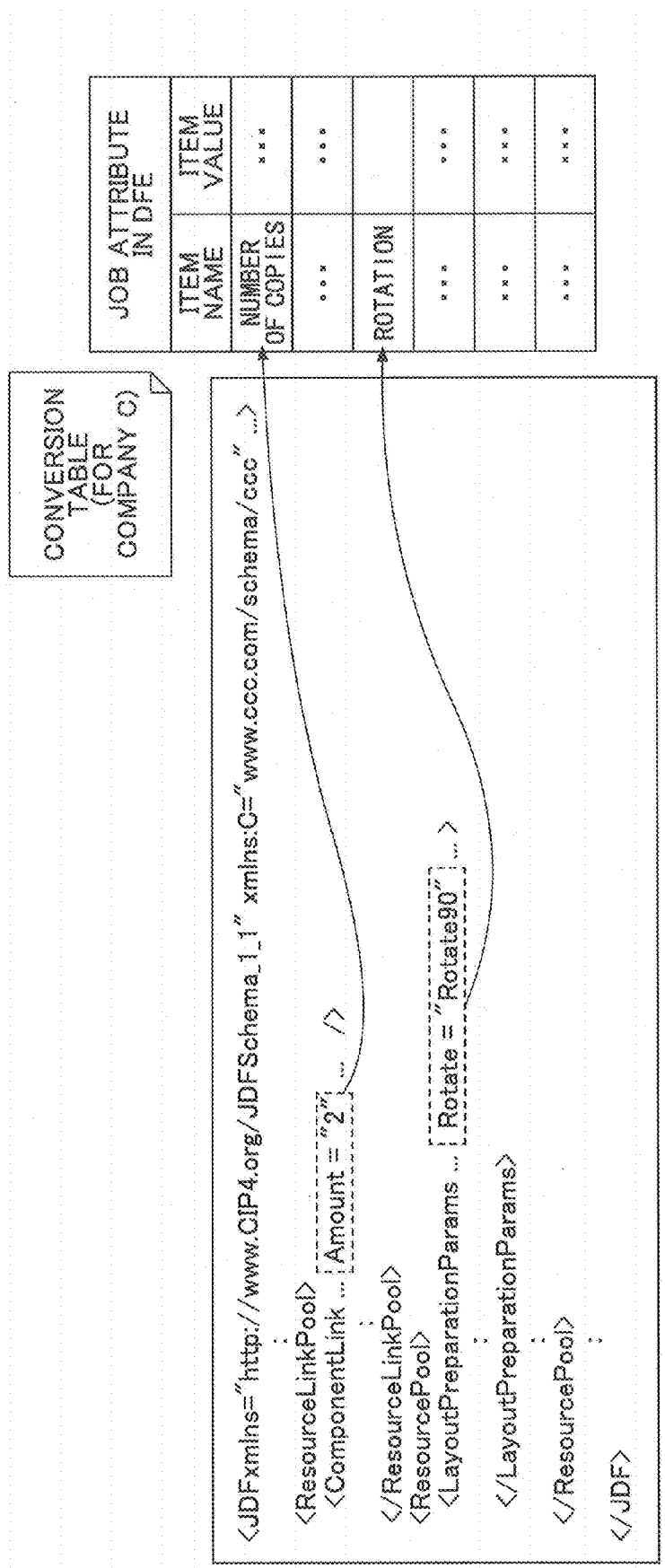
FIGS. 8A through 8C illustrate examples of creating the "job attribute in DFE"
Figure 8B:
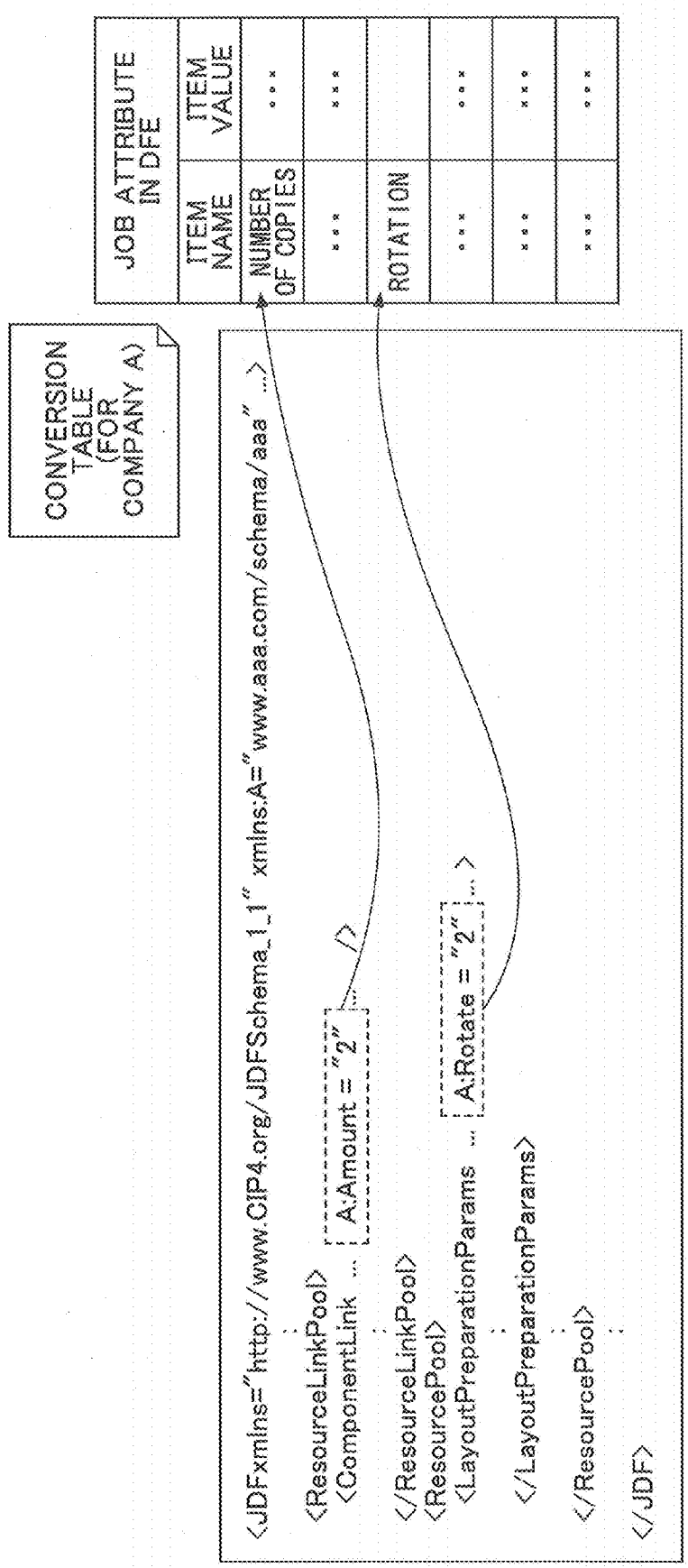
Figure 8C:
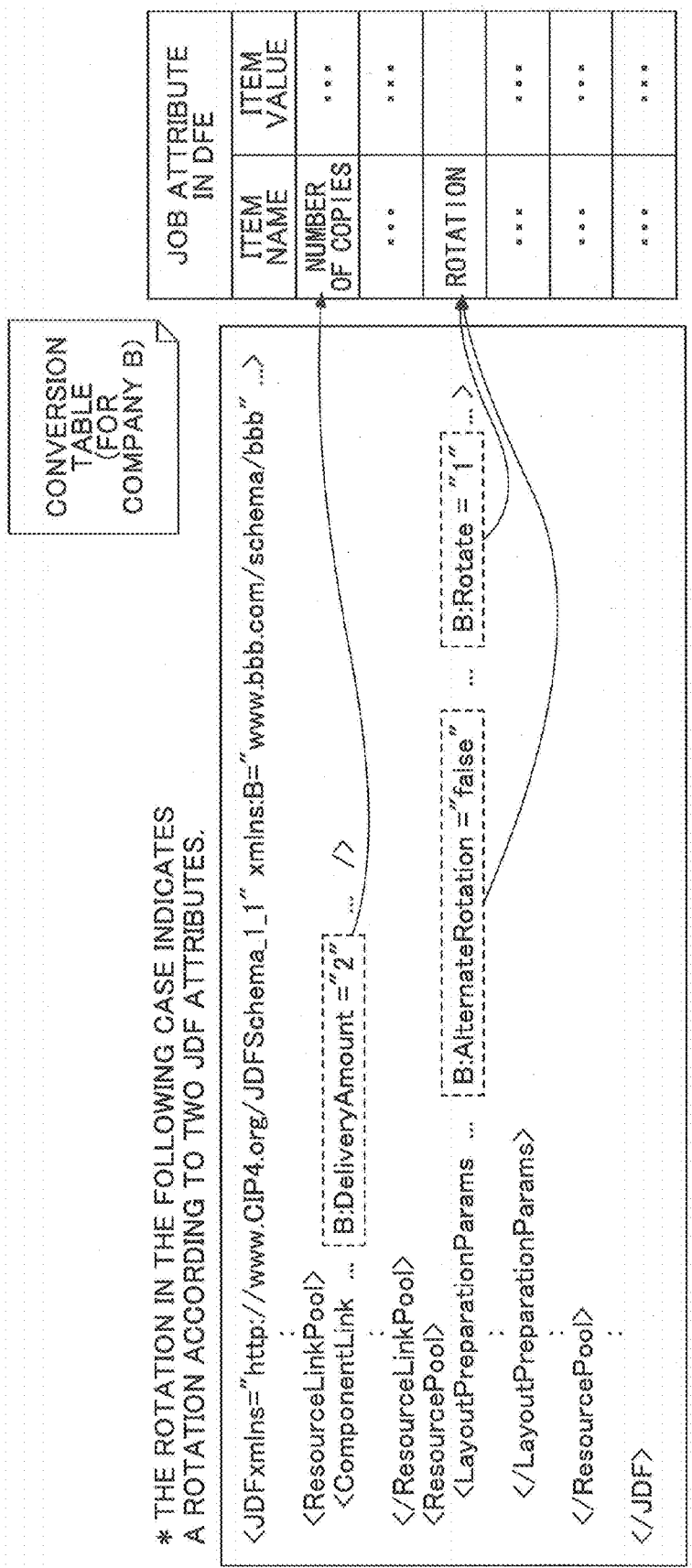

With reference to FIGS. 7A through 8C, a description is given of the creation of "job attribute in DFE". FIGS. 7A through 7C illustrate examples of conversion tables, and FIGS. 8A through 8C illustrate examples of creating the "job attribute in DFE". As for JDFs other than dummy JDFs, the JDF analysis unit 56 converts the JDF into a "job attribute in DFE" by using a conversion table 63 of the manufacturer (RIP engine assumed to process the print job) of the application 12 that has created the JDF. As for a dummy JDF, the JDF analysis unit 56 converts the dummy JDF into the "job attribute in DFE" by using all of the conversion tables 63. Therefore, for a dummy JDF, a "job attribute in DFE" is created for all of the RIP engines.

FIG. 7A illustrates an example of a conversion table of company C. In the conversion table of company C, the attribute value of the attribute name of "Amount" is associated with item value of the item name of "number of copies", and the attribute value of the attribute name of "Rotate" is associated with item value of the item name of "rotation".

The same conversion method is used for both a JDF and a dummy JDF. For example, as illustrated in FIGS. 8A through 8C, reference is made to the conversion table 63 in which an attribute in a tag of JDF is associated with an item of the "job attribute in DFE", and the attribute value of the JDF is assigned as an item value of the "job attribute in DFE".

The JDF analysis unit 56 not only stores in advance the conversion table of company C, but also the conversion table of company A and the conversion table of company B. FIG. 7B illustrates an example of a conversion table of company A, and FIG. 7C illustrates an example of a conversion table of company B. As described above, the JDF analysis unit 56 detects a description specifying an extension tag from JDF, determines the manufacturer of the application 12, and uses a conversion table 63 corresponding to each manufacturer.

The JDF can be converted in a similar manner as above, in the case of the JDF of company A and the JDF of company B. In the conversion table of company A, the attribute value of the attribute name of "A:Amount" is associated with item value of the item name of "number of copies", and the attribute value of the attribute name of "A:Rotate" is associated with item value of the item name of "rotation". In the conversion table of company B, the attribute value of the attribute name of "B:DeliveryAmount" is associated with item value of the item name of "number of copies", and the attribute value of the attribute name of "B:Rotate" is associated with item value of the item name of "rotation". Note that in the conversion table of company B, rotation becomes valid only when the attribute value of the attribute name of "B:AlternateRotation" is "false". Therefore, when it is determined that the JDF is of company A or company B, the "job attribute in DFE" can be created in the same manner as that for the JDF of company C.

Even when there is only one dummy JDF, different "job attributes in DFE" are created by three conversion tables 63, and therefore the number of created "job attributes in DFE" corresponds to the number of conversion tables 63. For example, in the dummy JDF of FIG. 6, the number of copies is "1" and the rotation angle is "0", and therefore the "job attributes in DFE" created by the respective conversion tables 63 of companies A through C are as follows.

Number of Copies
company C: 1 copy company A: 1 copy
  company B: error (or 1 copy)
Rotation Angle
company C: 0 degrees company A: error (or 0 degrees)
  company B: error (or 0 degrees)

Note that when the JDF analysis unit 56 determines that the format of the print job in combined printing is created by an application 12 of a different company from the company itself (company C), the JDF analysis unit 56 sets "Sheet Mode" in the item of "RIP control mode" of the "job attribute in DFE". When the application 12 is created by the company itself, or the format of the print job in combined printing is of an application 12 of the same company as the company itself (company C), the JDF analysis unit 56 sets "Page Mode" in the item of "RIP control mode". Accordingly, the RIP control unit 58 can control the RIP command to be output to the RIP engine 59 according to the "RIP control mode".

FIG. 9 schematically illustrates an example of the "job attributes in DFE". The "job attributes in DFE" are largely divided into "job information" relevant to executing a job, "edit information" relevant to raster data, and "finishing information" relevant to a finishing process.

The job information includes an item of "number of copes" specifying the number of copies.

The item of "orientation information" in the edit information specifies the orientation of printing.

The item of "print side information" in the edit information specifies the print side.

The item of "rotation" in the edit information specifies the rotation angle of the page.

The item of "enlarge/reduce" in the edit information specifies enlarge/reduce and the magnification ratio.

The item of "image position: offset" in the edit information specifies offset of the image.

The item of "image position: position adjustment information" in the edit information specifies position adjustment of the image.

The item of "layout information: custom/imposition arrangement" in the edit information specifies arrangement of the custom side.

The item of "layout information: number of pages" in the edit information specifies the number of pages to be included in a single sheet.

The item of "layout information: imposition information" in the edit information specifies information relevant to the arrangement of pages.

The item of "layout information: page order information" in the edit information specifies information relevant to the order of pages to be printed.

The item of "layout information: creep position adjustment" in the edit information specifies information relevant to the adjustment of the creep position.

The item of "margin information" in the edit information specifies information relevant to the margin such as a fit box and a gutter.

The item of "crop mark information: center crop mark information" in the edit information specifies information relevant to center crop mark.

The item of "crop mark information: corner crop mark information" in the edit information specifies information relevant to corner crop mark.

The item of "collate information" in the finishing information specifies information indicating whether to print a document in units of pages or in units of documents, when a plural number of copies of the document are to be printed.

The item of "stapling/binding information" in the finishing information specifies information relevant to stapling/binding.

The item of "punching information" in the finishing information specifies information relevant to punching.

The item of "creasing information" in the finishing information specifies information relevant to creasing.

The item of "trimming information" in the finishing information specifies information relevant to trimming.

The item of "output tray information" in the finishing information specifies information relevant to the output tray.

The item of "input tray information" in the finishing information specifies information relevant to the input tray.

The item of "cover sheet information" in the finishing information specifies information relevant to the cover sheet.

Furthermore, as illustrated in FIG. 9, a "RIP control mode" is set in the "job attribute in DFE". In the "RIP control mode", a "Page Mode" or a "Sheet Mode" is set. Note that in the case of a dummy JDF, it is assumed that "Page Mode" is set as the "RIP control mode".

FIG. 10 illustrates an example of a "RIP Parameter List".

The input output data type information specifies the type of input data and output data (as the input data and output data, not only PDL, but also a text file, and image data such as JPEG are also specified).

The input output data read write position specification method information specifies the method of specifying the offset (reading position/writing position) of input data and output data. For example, a specification is made to start from a specified position, from the present position, or from the tail end.

The input output data read write position information specifies the present processing position of the input data or the output data.

The input output data read write execution mode information specifies the execution mode. For example, READ, WRITE, READ WRITE are specified.

The unit information (dimension) specifies the unit used in the "RIP Parameter List". For example, "mm", "inch", "pel", and "point" are specified.

The input output data compression method information specifies the method of compressing the input data and output data. For example, "UNCOMPRESSED" and "PACKBITS" are specified.

The "RIP control mode" specifies the control mode in combined printing. For example, "Page Mode" or "Sheet Mode" is specified.

The input output image information unit includes "information relevant to output image", "information relevant to input image", and "information relevant to handling of image".

The image format type specifies the type of the format of the output image. For example, raster is specified.

The image format dimension specifies the dimension of the output image format.

The image formant resolution specifies the resolution of the output image format.

The position of the image specifies the position of the output image.

The color separation information specifies the color separation. For example, "k", "cmyk", and "separation" are specified.

The color plane fit policy information specifies the method of expanding the color plane.

The plane shift information specifies the shift amount of the color plane.

The color bit number of the image format specifies the color bit number of the output image format.

The image orientation information specifies the orientation of the page of the output image.

The image formation position information specifies the position information of the crop area.

The image formation size information specifies the size information of the crop area.

The image formation method information specifies the policy of clip.

The color ICC information specifies information relevant to the color ICC profile.

The font substitute information specifies information relevant to a substitute font.

The image formation base point information specifies the image formation starting point. For example, "center" and "top right" are specified.

The flat K black information specifies information relevant to flat K black.

The rendering information specifies information relevant to rendering (rasterizing).

The image format type specifies the type of the format of the input image. For example, raster is specified.

The image format dimension specifies the dimension of the input image format.

The image formant resolution specifies the resolution of the input image format.

The position of the image specifies the position of the input image.

The input data specifies input data.

The page range information specifies a page number.

The color ICC information specifies information relevant to the color ICC profile.

The scaling offset information specifies offset of an enlargement/reduction algorithm. For example, horizontal direction offset and vertical direction offset are specified.

The object/area information specifies the width and height of the object area.

The halftone information specifies the offset of halftone. For example, horizontal direction offset or vertical direction offset is specified.

The scaling/algorithm information specifies the method of scaling.

The information relevant to PDL specifies the data area, the size information, and the arrangement method of data.

The data area specifies the information of the area in which the PDL is stored. The font information and the information of the page number are included in the PDL that is present in this data area.

The size information specifies the size of the PDL.

The arrangement method of data specifies the arrangement method of data. For example, little endian or big endian is specified.

[Display Example of Raster Data]

Figure 11:
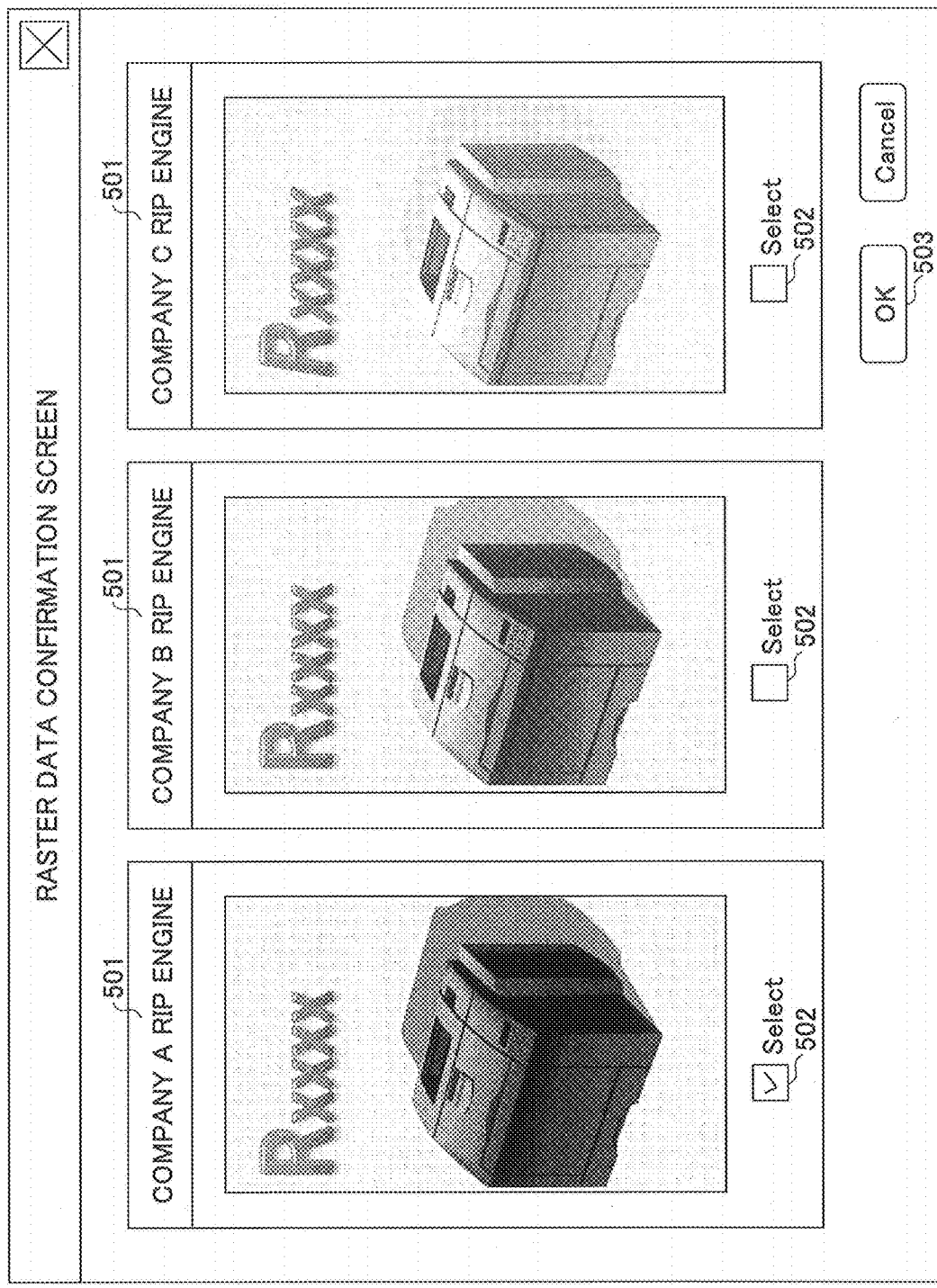
FIG. 11 illustrates an example of a raster data confirmation screen displayed on a display.

FIG. 11 illustrates an example of a raster data confirmation screen displayed on the display 330. When the company A RIP engine, the company B RIP engine, and the company C RIP engine create raster data, the UI control unit 54 reads all of the raster data items from the image storage unit 60, and displays the raster data items on the display 330. As illustrated in FIG. 11, in the raster data confirmation screen, the raster data items are displayed together with names 501 of the RIP engines 59. Furthermore, a selection box 502 is displayed in each raster data item.

In FIG. 11, the raster data according to the company A RIP engine has a darker shade than the raster data according to the company B RIP engine, and the raster data according to the company B RIP engine has a darker shade than the raster data according to the company C RIP engine. Furthermore, in the raster data according to the company C RIP engine, the font of "Rxxxx" is different from those of the other two raster data items. The user compares the raster data items, and selects the RIP engine 59 corresponding to the desired output result.

Note that according to operations by the user, the UI control unit 54 may display only one arbitrary raster data item on the display 330, or display the raster data in a partially enlarged manner. Accordingly, small differences can be visually observed. Furthermore, only two arbitrary raster data items may be displayed, or the display order may be changed. Accordingly, it is easy to compare a plurality of raster data items having small differences.

When the user presses an OK button 503, the UI control unit 54 reports, to the job control unit 55, the RIP engine 59 for which the check box has been checked. The job control unit 55 requests the printer control unit 61 to print the raster data created by the RIP engine 59 that has been reported.

Figure 12A:
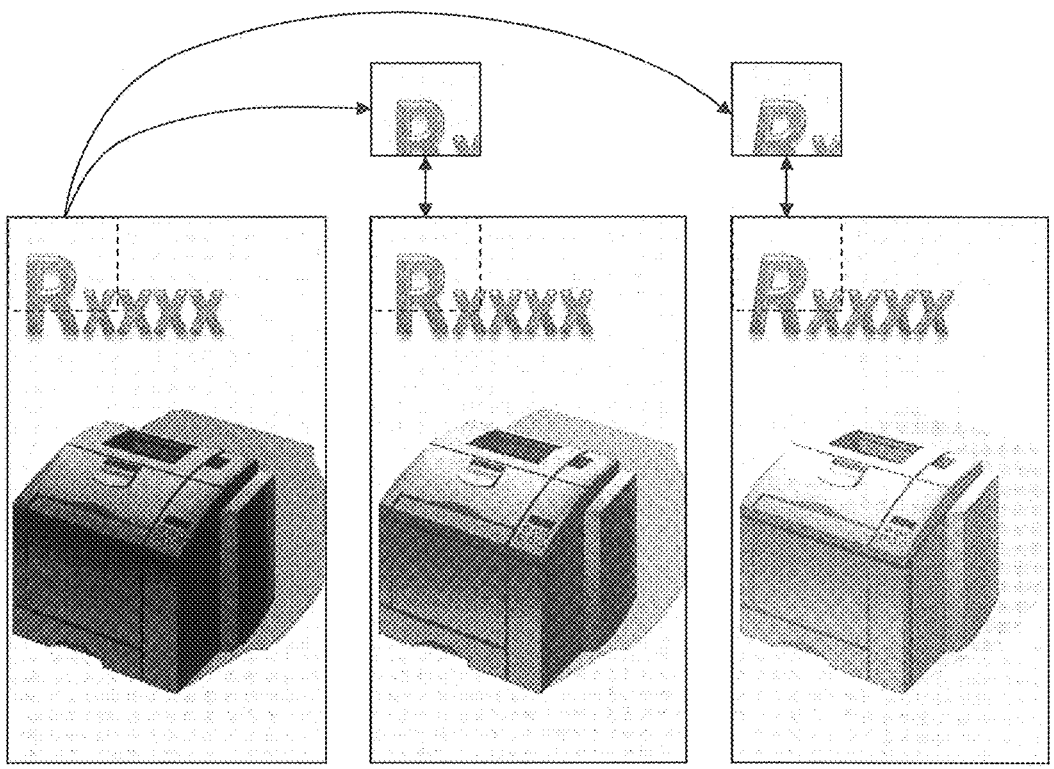
FIGS. 12A and 12B illustrate the detection of the difference between the raster data items.
Figure 12B:
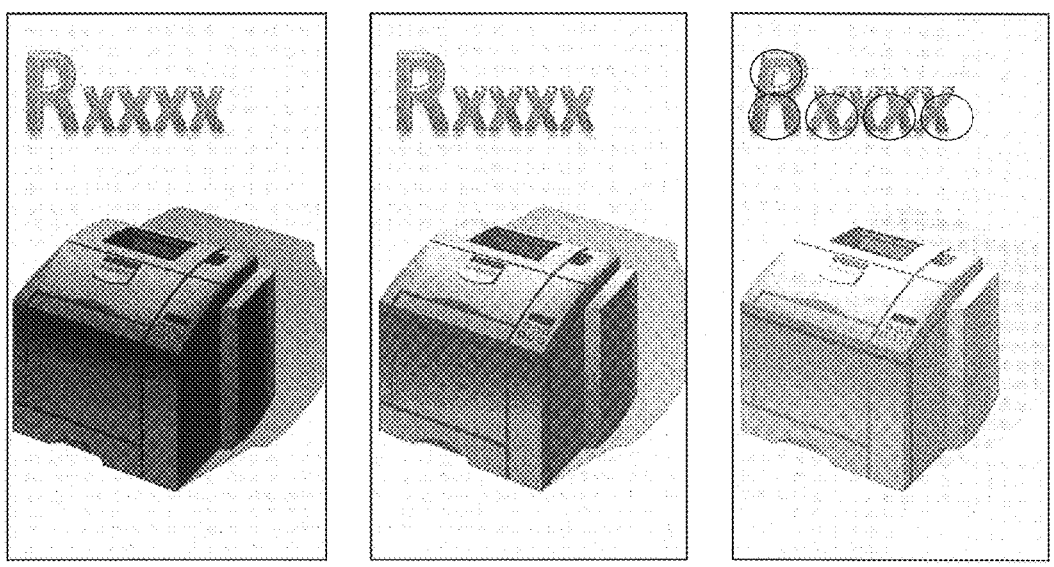

Furthermore, as illustrated in FIGS. 12A and 12B, the difference between the raster data items may be detected and reported to the user. FIG. 12A illustrates an example of detecting the difference between raster data items. For example, the UI control unit 54 focuses on one raster data item that the user has specified, divides this raster data item into rectangles, and compares the pixel value of each rectangle with a rectangle of the same position in other raster data items. The absolute value of the difference of the pixel value of the rectangle is calculated, and a total absolute value is obtained for each rectangle. The closer the output results, the smaller is the total value of the difference of the pixel values in the rectangle area.

For example, when the user focuses on the raster data of the company C RIP engine, in the raster data of FIG. 11, only the font of "Rxxxx" of the company C RIP engine is different, and therefore this is detected as an area having a large total difference, by the result of comparison with company A and by the result of comparison with company B. As illustrated in FIG. 12B, for example, the UI control unit 54 circles this area to emphasize the area having a large total difference.

When the user switches the raster data item to be focused on, the same processes as above are repeated. By these processes, when there is a rectangular area that is different in only one company, even if the raster data item to be focused on is switched, the same area is displayed in an emphasized manner. Therefore, the user can easily narrow down the area where there is a difference in the raster data.

Furthermore, in a case where the three raster data items are slightly different in terms of the shade, even when the raster data item to be focused on is switched, the area having a different shade is constantly displayed in an emphasized manner, and therefore the user can easily confirm that the shades are different among all of the RIP engines.

[Operation Procedure]

FIG. 13 is an example of a sequence diagram indicating the operation procedures of DFE.

S1: The job receiving unit 51 acquires a print job (PDL) from a hot folder.

S2: The dummy creating unit 62 detects that the JDF is not attached to the print job, and attaches a dummy JDF to the print job.

S3: The job receiving unit 51 outputs the print job (dummy JDF+PDL) to the system control unit 52.

S4-1: When there is a setting in the DFE 32 to store the print job in the job data storage unit 53, the system control unit 52 stores the print job in the job data storage unit 53.

S4-2: When there is no setting in the DFE 32 to store the print job in the job data storage unit 53, the system control unit 52 outputs the print job to the job control unit 55.

S5: The job control unit 55 outputs the dummy JDF and a JDF conversion request, to the JDF analysis unit 56.

S6: The JDF analysis unit 56 detects that the dummy JDF is attached to the JDF conversion request, or acquires a request from the job control unit 55, and creates "job attributes in DFE" by each of the conversion tables 63 corresponding to the RIP engines 59. In this example, it is assumed that a "job attribute A in DFE", a "job attribute B in DFE", and a "job attribute C in DFE" are created.

S7: The JDF analysis unit 56 outputs the "job attribute A in DFE", the "job attribute B in DFE", and the "job attribute C in DFE" to the job control unit 55.

S8: The job control unit 55 creates a "RIP Parameter List A" from the "job attribute A in DFE" and the PDL, creates a "RIP Parameter List B" from the "job attribute B in DFE" and the PDL, and creates a "RIP Parameter List C" from the "job attribute C in DFE" and the PDL.

S9: The job control unit 55 outputs a RIP request together with the "RIP Parameter List A", the "RIP Parameter List B", and the "RIP Parameter List C", to the RIP control unit 58. The RIP execution request or the "RIP Parameter List" includes, for example, information for associating the "RIP Parameter List" with the RIP engine 59.

S10: The RIP control unit 58 outputs a RIP instruction to the company A RIP engine. That is to say, the RIP control unit 58 refers to the "RIP Parameter List" and sends a RIP command to the company A RIP engine.

S11: The RIP control unit 58 acquires the RIP result (raster data A).

S12: The RIP control unit 58 stores the raster data A in the image storage unit 60.

S13: The RIP control unit 58 outputs a RIP instruction to the company B RIP engine.

S14: The RIP control unit 58 acquires the RIP result (raster data B).

S15: The RIP control unit 58 stores the raster data B in the image storage unit 60.

S16: The RIP control unit 58 outputs a RIP instruction to the company C RIP engine.

S17: The RIP control unit 58 acquires the RIP result (raster data C).

S18: The RIP control unit 58 stores the raster data C in the image storage unit 60.

Note that the order of creating the raster data items by the respective RIP engines is random. Furthermore, the raster data items may be created in parallel in terms of time. Furthermore, the RIP control unit 58 outputs a RIP instruction to the RIP engine 59 according to the "RIP control mode"; however, detailed procedure are not described herein.

S19: When the raster data items have been created by all RIP engines 59, the RIP control unit 58 outputs a RIP end report to the job control unit 55. Note that the RIP end report may be output to each RIP engine.

S20: When the RIP end report is received, the job control unit 55 outputs the raster data items A through C and a plurality of RIP result display requests, to the UI control unit 54.

S21: The UI control unit 54 displays a raster data confirmation screen on the display 330.

S22: When the user selects a RIP engine 59, the UI control unit 54 acquires the selection result.

S23: The UI control unit 54 outputs the selection result to the job control unit 55.

S24: The job control unit 55 specifies the RIP engine 59 based on the selection result, and outputs a print execution request to the printer control unit 61.

As described above, even when a JDF is not attached to the print job, the DFE 32 according to the present embodiment can create the raster data with all of the RIP engines and print the raster data that the user has confirmed. Furthermore, the raster data is created with all of the RIP engines 59, and therefore the optimum RIP engine 59 can be selected from the viewpoint of PDL.

Second Embodiment

In the first embodiment, when the JDF is not attached to the print job, a "job attribute in DFE" is created for each RIP engine.

However, even when a JDF is attached, the following inconveniences may arise. That is to say, when a JDF is attached, the JDF analysis unit 56 is able to determine an appropriate RIP engine 59 for the manufacturer of the application 12 that has created the JDF; however, the print result may not be what the user had intended. Furthermore, the result of determining the manufacturer of the application 12 may not necessarily be appropriate, or the JDF may be created by an unknown application 12.

Therefore, in the present embodiment, a description is given of the DFE 32 that creates a "job attribute in DFE" for each RIP engine, even when the JDF is attached to the print job. According to the present embodiment, even when the JDF is attached, the raster data is created by all of the RIP engines 59, and therefore the user can select a RIP engine 59 by which the intended print result can be obtained.

Note that in the present embodiment, elements denoted by the same reference numerals as those in FIGS. 2 through 4 have the same functions, and therefore only the main elements of the present embodiment may be described.

Figure 14:
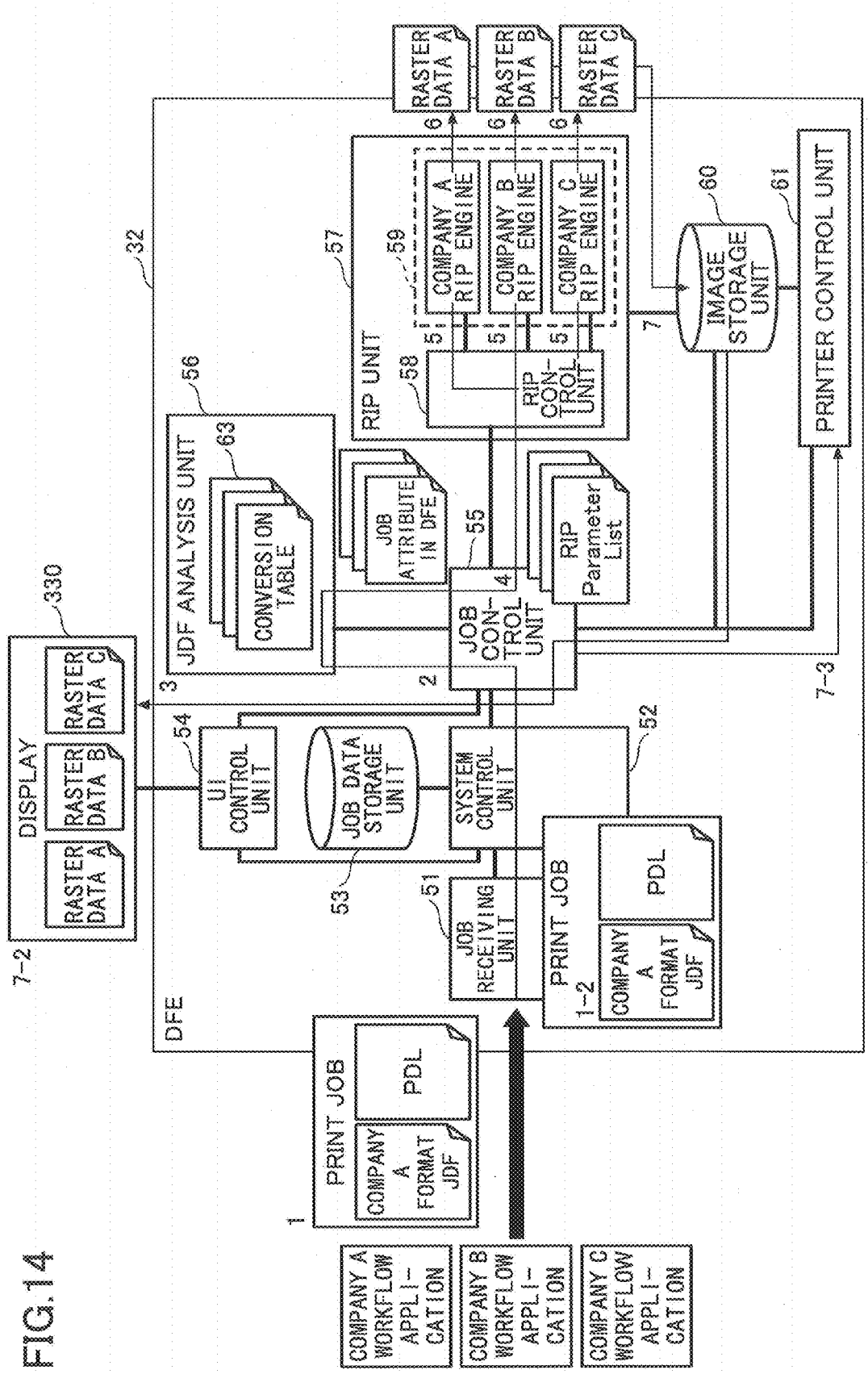
FIG. 14 schematically illustrates functional blocks and operations of a DFE (second embodiment)

FIG. 14 schematically illustrates functional blocks and operations of the DFE 32 according to the present embodiment.

1. The job receiving unit 51 receives a print job (JDF+PDL) from the application 12 of company A. The print job may be received from the application 12 of company B or company C.

1-2. The JDF is included in the print job, and therefore the dummy creating unit 62 does not create a dummy JDF.

2. The print job is output to the job control unit 55 via the system control unit 52. The job control unit 55 outputs the JDF to the JDF analysis unit 56.

3. The JDF analysis unit 56 converts the JDF into "Job attributes for DFE", corresponding to a number of types of RIP engines 59. That is to say, even when it is determined that the JDF has been created by an application 12 of company A, the JDF analysis unit 56 creates a "job attribute in DFE" for all of the RIP engines 59.

4. The job control unit 55 generates three "RIP Parameter Lists" from the PDL and three "Job attributes for DFE", and outputs the "RIP Parameter Lists" to the RIP unit 57.

5. The RIP control unit 58 outputs the "RIP Parameter List" for company A to the company A RIP engine, outputs the "RIP Parameter List" for company B to the company B RIP engine, and outputs the "RIP Parameter List" for company C to the company C RIP engine.

6. The company A RIP engine, the company B RIP engine, and the company C RIP engine respectively execute render processes based on the "RIP Parameter Lists", and create raster data A through C.

7. The RIP unit 57 stores the raster data A through C in the image storage unit 60 after the raster process has ended.

7-2. The job control unit 55 displays the raster data A through C on a display 330. Accordingly, the user is able to confirm which RIP engine 59 has created the raster data having a desired finish, before printing the data. The user inputs the selection result of the RIP engine 59 in the UI control unit 54.

7-3. The job control unit 55 outputs the selection result reported from the UI control unit 54, to the printer control unit 61. The printer control unit 61 sends the raster data, which is selected from among the three raster data items stored in the image storage unit 60, to the printer 31, and executes printing.

Therefore, in the present embodiment, even when the print job includes the JDF, a number of raster data items are created corresponding to the number of types of the RIP engine 59, and the created raster data items are displayed on the display 330. Therefore, the user can select the appropriate RIP engine 59 and execute the printing. Furthermore, as the raster data items are actually created, the user can confirm the differences that do not appear in the JDF. Furthermore, the raster data is created with all of the RIP engines 59 individually, and therefore the optimum RIP engine 59 can be selected from the viewpoint of PDL.

Third Embodiment

In the first embodiment, one dummy JDF is created when a JDF is not attached to the print job; however, in the present embodiment, a description is given of the DFE 32 that creates a dummy JDF for every RIP engine 59.

The extension definition of the JDF is different according to the manufacturer of the application 12, and therefore by creating a dummy JDF for each RIP engine 59, a dummy JDF appropriate for the conversion table 63 an be created. Therefore, when performing the conversion based on the conversion table 63, it is easy to convert the standard attribute value of the dummy JDF into an appropriate "job attribute in DFE".

Note that in the present embodiment, elements denoted by the same reference numerals as those in FIGS. 2 through 4 have the same functions, and therefore only the main elements of the present embodiment may be described.

Figure 15:
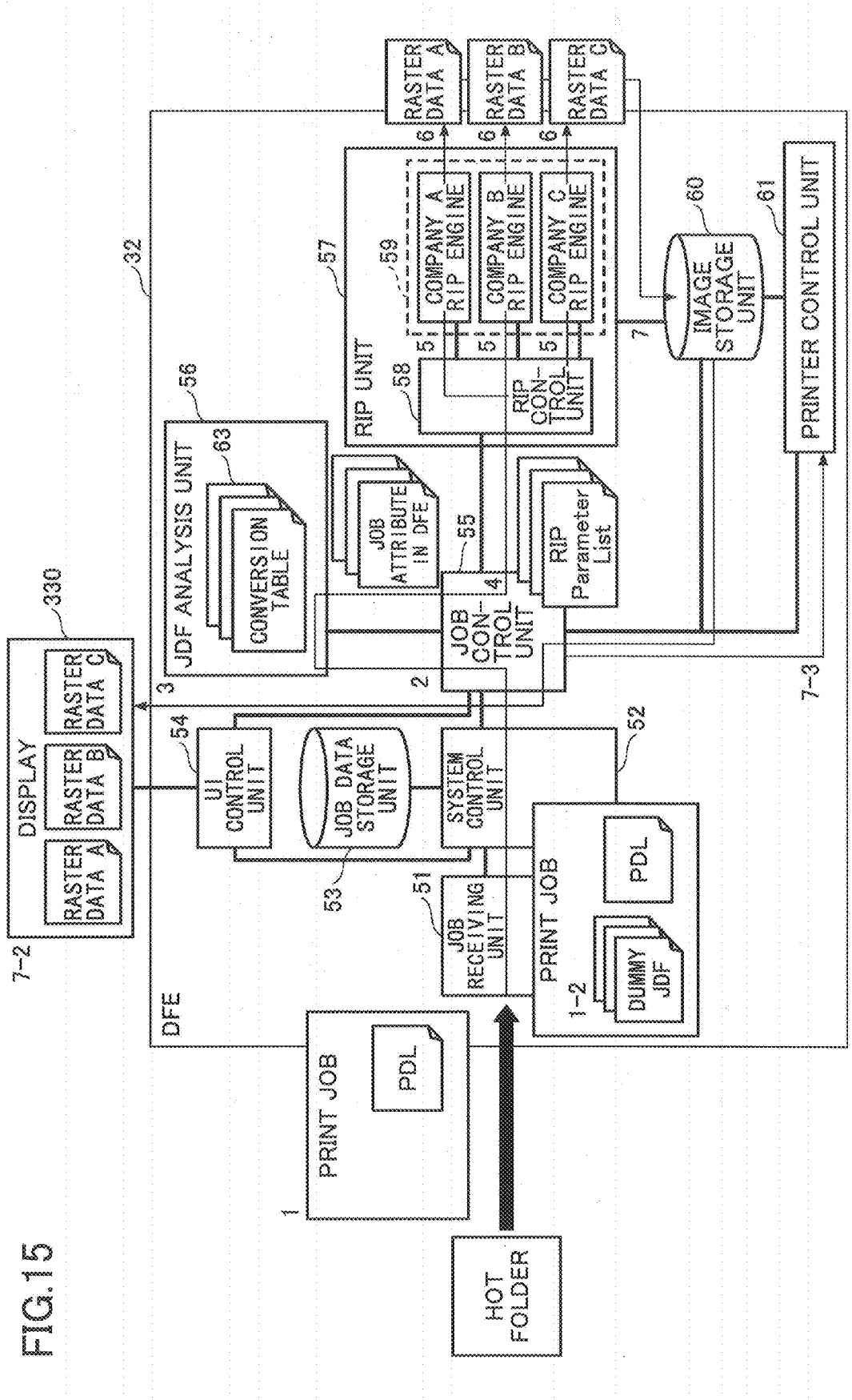
FIG. 15 schematically illustrates functional blocks and operations of a DFE (third embodiment).

FIG. 15 schematically illustrates functional blocks and operations of the DFE 32 according to the present embodiment.

1. The job receiving unit 51 receives a print job (PDL) from an input source by which the JDF is not attached, such as a hot folder or a USB memory.

1-2. When the print job does not include the JDF, a dummy creating unit 62 creates a dummy JDF. Here, the dummy creating unit 62 attaches, to the print job, dummy JDFs that have been created in advance based on the company A format JDF, the company B format JDF, and the company C format JDF.

2. The print job is output to the job control unit 55 via the system control unit 52. The job control unit 55 outputs three dummy JDFs to the JDF analysis unit 56.

3. The JDF analysis unit 56 analyzes the dummy JDF of the company A format and detects that the JDF is of company A, analyzes the dummy JDF of the company B format and detects that the JDF is of company B, and analyzes the dummy JDF of the company C format and detects that the JDF is of company C. Then, the JDF analysis unit 56 converts the dummy JDFs into "Job attributes for DFE", corresponding to a number of types of RIP engines 59, by using the respective conversion tables 63.

4. The job control unit 55 generates three "RIP Parameter Lists" from the PDL and three "Job attributes for DFE", and outputs the "RIP Parameter Lists" to the RIP unit 57.

5. The RIP control unit 58 outputs the "RIP Parameter List" for company A to the company A RIP engine 59, outputs the "RIP Parameter List" for company B to the company B RIP engine 59, and outputs the "RIP Parameter List" for company C to the company C RIP engine 59.

6. The company A RIP engine 59, the company B RIP engine 59, and the company C RIP engine 59 respectively execute render processes based on the "RIP Parameter Lists", and create raster data A through C.

7. The RIP unit 57 stores the raster data A through C in the image storage unit 60 after the raster process has ended.

7-2. The job control unit 55 displays the raster data A through C on the display 330. Accordingly, the user is able to confirm which RIP engine 59 has created the raster data having a desired finish, before printing the data. The user inputs the selection result of the RIP engine 59 in the UI control unit 54.

7-3. The job control unit 55 outputs the selection result reported from the UI control unit 54, to the printer control unit 61. The printer control unit 61 sends the raster data, which is selected from among the three raster data items stored in the image storage unit 60, to the printer, and executes printing.

As described above, in the present embodiment, when the print job does not include the JDF, dummy JDFs in formats of the respective companies are created, and therefore it is easy to convert a standard attribute value to an appropriate "job attribute in DFE", when creating the "job attributes in DFE". Furthermore, raster data that has been created from the "job attribute in DFE" is displayed on the display 330, and therefore the user is able to select the appropriate RIP engine 59 by which the desired print result can be obtained from among the raster data items created by the dummy JDFs in the formats of the respective companies, and execute the printing.

Preferred Modification Examples

The information processing device and the information processing method are not limited to the specific embodiments described herein, and variations and modifications may be made without departing from the spirit and scope of the present invention.

For example, in FIG. 2, the DFE 32 has all of the functions; however, these functions may be disposed in different devices that can perform communication, via the network 3. For example, the RIP engines 59 of the respective companies and the JDF analysis unit 56 may be present in a network that can be accessed by the DFE 32.

The same applies to the image storage unit 60; the image storage unit 60 may be present in a network that can be accessed by the DFE 32. In this case, the UI control unit 54 displays, on the display 330, the raster data acquired from the image storage unit 60 via the network 3.

Furthermore, when the DFE 32 includes the image storage unit 60, for example, the client PC 11 acquires the raster data from the DFE 32 operating as a server via the network 3, and displays the raster data on a display connected to the client PC 11. As the client PC 11 sends, to the DFE 32, the selection result of the RIP engine 59 selected by the user, the DFE 32 can print the selected raster data.

According to one embodiment of the present invention, an information processing device is provided, by which print results that are close to the intension of the user, can be obtained.

The information processing device and the information processing method are not limited to the specific embodiments described herein, and variations and modifications may be made without departing from the spirit and scope of the present invention.

The present application is based on and claims the benefit of priority of Japanese Priority Patent Application No. 2014-030978, filed on Feb. 20, 2014 and Japanese Priority Patent Application No. 2015-026697, filed on Feb. 13, 2015, the entire contents of which are hereby incorporated herein by reference.

What is claimed is:

1. An information processing device comprising:
a processor configured to:
create render data based on print data that is included in a print job generated by a plurality of applications respectively corresponding to a plurality of companies; and
determine whether the print job includes setting information relating to a setting of the print job; and
a storage unit configured to store, in association with each other:
association information that includes the setting information and that is related to company information that is information indicating the company corresponding to the application; and
render data creation information that corresponds to each piece of the company information and that is used by the processor to create the render data;
wherein when the processor determines that the print job includes the setting information, the processor identifies the company information corresponding to the setting information, and acquires the render data creation information corresponding to the identified company information;
wherein when the processor determines that the print job does not include the setting information, the processor creates a plurality of pieces of the render data creation information respectively corresponding to a plurality of pieces of the association information stored in the storage unit; and
wherein the information processing device further includes:
a display unit configured to display, in a selectable manner, the plurality of pieces of the render data generated based on the plurality of pieces of the render data creation information created when the processor determines that the print job does not include the setting information.

2. The information processing device of claim 1 wherein:
the processor is configured to decide, from the association information, the render data creation information corresponding to the company information that is identified, and to decide a render data creating unit corresponding to the company information,
wherein the render data creating unit that is decided creates the render data based on the render data creation information that is decided.

3. The information processing device of claim 2 wherein:
the processor is configured to acquire the print job, and to attach, to the print job, the setting information in which a standard setting value is set, based on determining that the acquired print job does not include the setting information, and to convert the setting information attached to the print job into the render data creation information to be used by each of a plurality of render data creating units.

4. The information processing device of claim 3 wherein:
the processor is configured to determine whether the setting information has been attached to the print job based on whether the setting information includes a description defined in advance,
wherein when the processor determines that the setting information has been attached to the print job, the processor coverts the setting information attached to the print job into the render data creation information to be used by each of the render data creating units.

5. The information processing device of claim 3 wherein:
the setting information is created in different formats for each of the render data creating units, the processor attaches, to the print job, the setting information in which a standard setting value is set in a format of each of the render data creating units, and
the processor converts the setting information, which is in the format of each of the render data creating units, attached to the print job into the render data creation information to be used by each of the render data creating units.

6. The information processing device of claim 1 wherein:
the processor is configured to compare pieces of the render data created by a plurality of render data creating units with each other,
wherein the display unit displays an emphasis for an area in the render data that is different from other render data.

* * * * *